US008811768B2

(12) United States Patent
Meyers et al.

(10) Patent No.: US 8,811,768 B2
(45) Date of Patent: Aug. 19, 2014

(54) IMAGE ENHANCEMENT SYSTEM AND METHOD

(75) Inventors: Ronald Everett Meyers, Columbia, MD (US); Keith Scott Deacon, Coumbia, MD (US)

(73) Assignee: The United States of America as Represented by the Secretary of the Army, Washington, DC (US)

(*) Notice: Subject to any disclaimer, the term of this patent is extended or adjusted under 35 U.S.C. 154(b) by 106 days.

(21) Appl. No.: 13/477,890

(22) Filed: May 22, 2012

(65) Prior Publication Data

US 2012/0229668 A1    Sep. 13, 2012

Related U.S. Application Data

(63) Continuation-in-part of application No. 13/247,470, filed on Sep. 28, 2011, now Pat. No. 8,532,427, and a continuation-in-part of application No. 13/198,133, filed on Aug. 4, 2011, now Pat. No. 8,373,107, which is a continuation-in-part of application No. 12/819,602, filed on Jun. 21, 2010, now Pat. No. 8,242,428, which is a continuation-in-part of application No. 12/330,401, filed on Dec. 8, 2008, now Pat. No. 7,812,303, said application No. 12/819,602 is a continuation-in-part of application No. 12/343,384, filed on Dec. 23, 2008, now Pat. No. 7,847,234, said application No. 13/198,133 is a continuation-in-part of application No. 12/837,668, filed on Jul. 16, 2010, now Pat. No. 8,053,715.

(60) Provisional application No. 60/993,792, filed on Sep. 13, 2007.

(51) Int. Cl.
*G06K 9/38* (2006.01)
*G06K 9/40* (2006.01)

(52) U.S. Cl.
USPC ........................................... 382/274; 382/272

(58) Field of Classification Search
None
See application file for complete search history.

(56) References Cited

U.S. PATENT DOCUMENTS 7,536,012 B1   5/2009   Meyers et al.
7,812,303 B2   10/2010  Meyers et al.
7,847,234 B2   12/2010  Meyers et al.

(Continued)

OTHER PUBLICATIONS

Einstein, et al. "Can Quantum-Mechanical Description of Physical Reality Be Considered Complete?" Physical Review, vol. 47, May 15, 1935, pp. 777-800.

(Continued)

*Primary Examiner* — Michelle Entezari
(74) *Attorney, Agent, or Firm* — Lawrence E. Anderson

(57) ABSTRACT

A method and system for imaging information comprising at least one processor for processing information; a light source for illuminating first and second locations; a spatial receiver located at the second location for receiving the illuminating light comprising an array of pixel locations for detecting high resolution spatial information concerning the illuminating light; the spatial receiver being operatively connected, to the at least one processor and operating to transmit high resolution spatial information correlated to specific intervals of time to the processor; the at least one receiver operatively connected to the processor(s) and operative to receive light reflected from a subject and operating to transmit low resolution spatial information to the processor correlated to specific intervals of time; the processor operating to correlate a response by the at least one receiver with spatial information derived from the spatial receiver at correlating time intervals to create a high resolution image.

20 Claims, 19 Drawing Sheets

(56) References Cited

U.S. PATENT DOCUMENTS

| | | | |
|---|---|---|---|
| 8,053,715 B2 | 11/2011 | Meyers et al. | |
| 8,242,428 B2 | 8/2012 | Meyers et al. | |
| 8,373,107 B2 | 2/2013 | Meyers et al. | |
| 2008/0175452 A1* | 7/2008 | Ye et al. | 382/128 |
| 2009/0010493 A1* | 1/2009 | Gornick et al. | 382/103 |
| 2009/0257683 A1* | 10/2009 | Cloud et al. | 382/299 |

OTHER PUBLICATIONS

Shapiro, J.H. "Computational Ghost Imaging,"Massachusetts Institute of Technology, Research Laboratory of Electronics, Cambridge, Massachusetts 02139, USA, arXiv:0807.2614v1 [quant-ph] Jul. 16, 2008.

R. Meyers, K. Deacon, and Y. Shih, 'Ghost-imaging experiment by measuring reflected photons,' Phys. Rev. A 77, 041801(R) (2008).

D. L. Donoho, "Compressed sensing," IEEE Transactions on Information Theory, vol. 52, pp. 1289-1306, (2006).

E. Candes, J. Romberg, and T. Tao, "Robust uncertainty principles: Exact signal Reconstruction from Highly Incomplete Frequency Information," IEEE Trans. Inf. Theory, 52, 489 (2006).

Giuliano Scarcelli, et al. "Can Two-Photon Correlation of Chaotic Light Be Considered as Correlation of Intensity Fluctuations?" Physics Review Letters 96, 063602 (2006).

O. Katz, Y. Bromberg, Y. Silberberg, "Compressive Ghost Imaging," Appl Phys. Lett., 95, 131110 (2009).

J. Shapiro, "Computational ghost imaging," Phys. Rev. A vol. 78 061802(R) (Dec. 18, 2008).

R. Meyers and K. Deacon,"Quantum Ghost Imaging Experiments At ARL", Proc. SPIE vol. 7815, 781501, (2010).

M. Figueiredo, R. Nowak, and S. Wright, "Gradient projection for sparse reconstruction: Application to compressed sensing and other inverse problems (2007)," IEEE J. Sel. Topics on Signal Processing, 1, 586 (2007).

R. Meyers, K. Deacon, and Y.Shih,"A new Two-photon Ghost Imaging Experiment with Distortion Study," J. Mod. Opt., 54, 2381-2392 (2007).

R. Meyers, K. Deacon, and Y. Shih, "Quantum imaging of an obscured object by measurement of reflected photons," Proc. SPIE vol. 7092, 70920E (2008) doi:10.1117/12.797926.

R. Meyers, K. Deacon, and Y. Shih, "Turbulence-free ghost imaging," Appl. Phys. Lett. 98, 111115 (Mar. 18, 2011);doi:10.1063/1.3567931.

R. Glauber, "The Quantum Theory of Optical Coherence," Phys. Rev. 130, 2529 (1963) 131, 2766 (Jun. 1963).

T. B. Pittman, et al. "Optical imaging by means of two-photon quantum entanglement,"Phys. Rev. A 52, R3429-R3432 (1995).

D. Strekalov, et al. "Observation of Two-Photon 'Ghost' Interference and Diffraction,"Phys. Rev. Lett. 74, 3600-3603 (1995).

R. Meyers, K. Deacon, Y. Shih, "Positive-negative turbulence-free ghost imaging," Appl. Phys. Lett. 100, 131114 (2012) (Mar. 29, 2012).

Wang, Y. Cai, and O. Korotkova, "Ghost imaging with partially coherent light in turbulent atmosphere," Proc. SPIE 7588, 75880F (2010).

J. Cheng,"Ghost imaging through turbulent atmosphere," Opt. Express 17, Issue 10, pp. 7916-7921 (2009).

Scarcelli, G. "Can Two-PhoPpton Correlation of Chaotic Light Be Considered as Correlation of Intensity Fluctuations?", Physical Review Letters PRL 96 063602 (2006).

Brown, R. Hanbury, "The Question of Correlation Between Photons in Coherent Light Rays", Nature, No. 4548, Dec. 29, 1956, pp. 1447-1450.

Klyshko, D.N., "Combined EPR and Two-Slit Experiments: Interference of Advanced Waves", Physics Letters A, vol. 132, No. 6.7, pp. 299-304 (1988).

Zhang, Da, et al., "Correlated two-photon imaging with true thermal light", Optics Letters, vol. 30, No. 18, Sep. 15, 2005, pp. 2354-2356.

Meyers, Ron, et al., "A new two-photon ghost imaging experiment with distortion study", Journal of Modern Optics, vol. 54, Nos. 16-17, 10-20 Nov. 2007, 2381-2392.

A.V. Sergienko, et al., "Two-photon geometric optical imaging and quantum 'cryptoFAX'" Proc. SPIE Int. Soc. Opt. Eng.(2799), p. 164-171, 199.

Spiller, "Quantum Information Processing: Cryptography, Computation, and Teleportation," Proceedings of the IEEE Dec 1996 Vol. 84 Issue:12, pp. 1719-1746 ISSN: 0018-9219.

Jennewein, Thomas, et al. "Experimental Nonlocality Proof of Quantum Teleportation and Entanglement Swapping," Physical Review Letters vol. 88, No. 1, (Jan. 2002) 124-141.

Jennewein, Thomas, et al., Quantum Communication and Teleportation Experiments Using Entangled Photon Pairs (Dissertation zur Erlangung des Grades) "Doktor der Naturwissenschafen" Jun. 2002.

Roisse, et al. "Walk-off and Phase-compensated Resonantly Enhanced Frequency-doubling of Picosecond Pulses Using Type II Nonlinear Crystal," Applied Physics B: Lasers and Optics, vol. 69, No. 1, 25-27, DOI: 10.1007/s003400050764 (1999).

B.C. Jacobs, "Quantum Cryptography in Free Space," Nov. 15, 1996, Optics Letters, vol. 21, No. 22, p. 1854-1856.

* cited by examiner

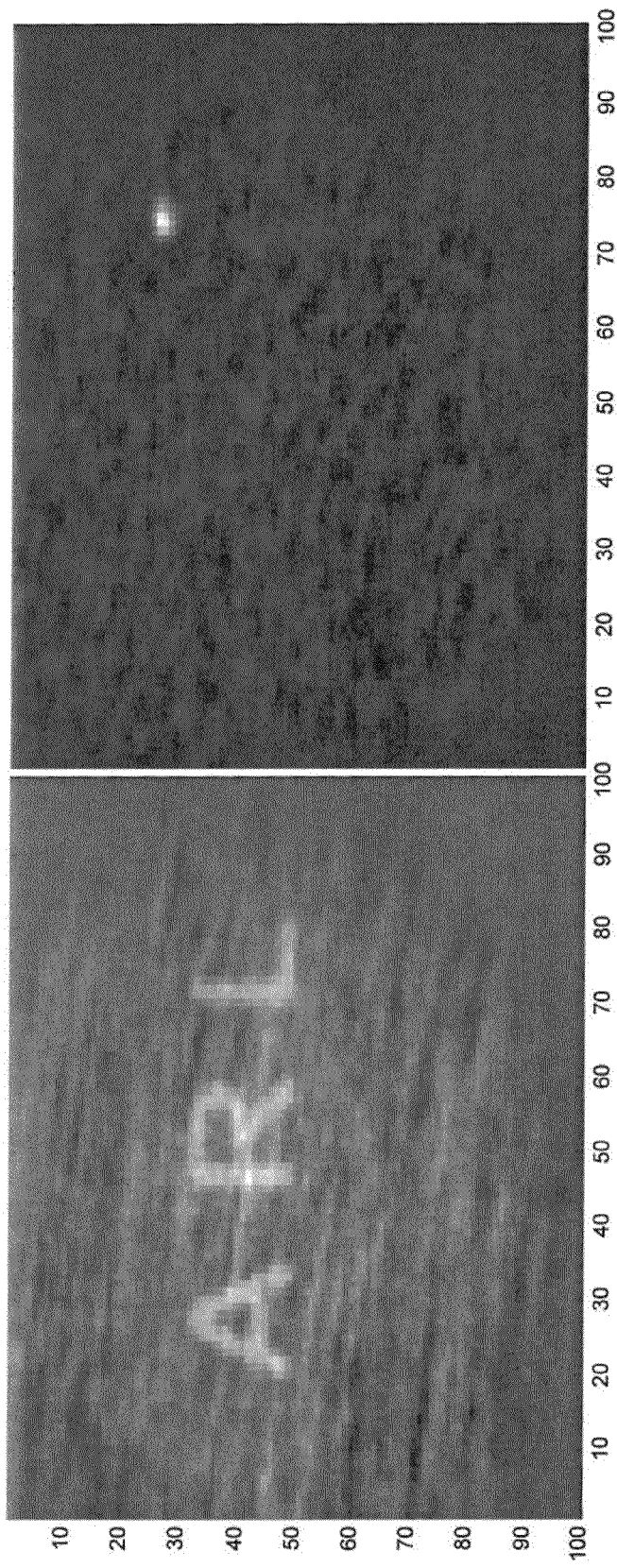
FIG. 7A Ghost Image Computing using Compressive Sensing (CS) techniques using a single bucket that measured all the light from the target subject.
FIG. 7B Sample single intermediate 2x2 bucket Ghost Image

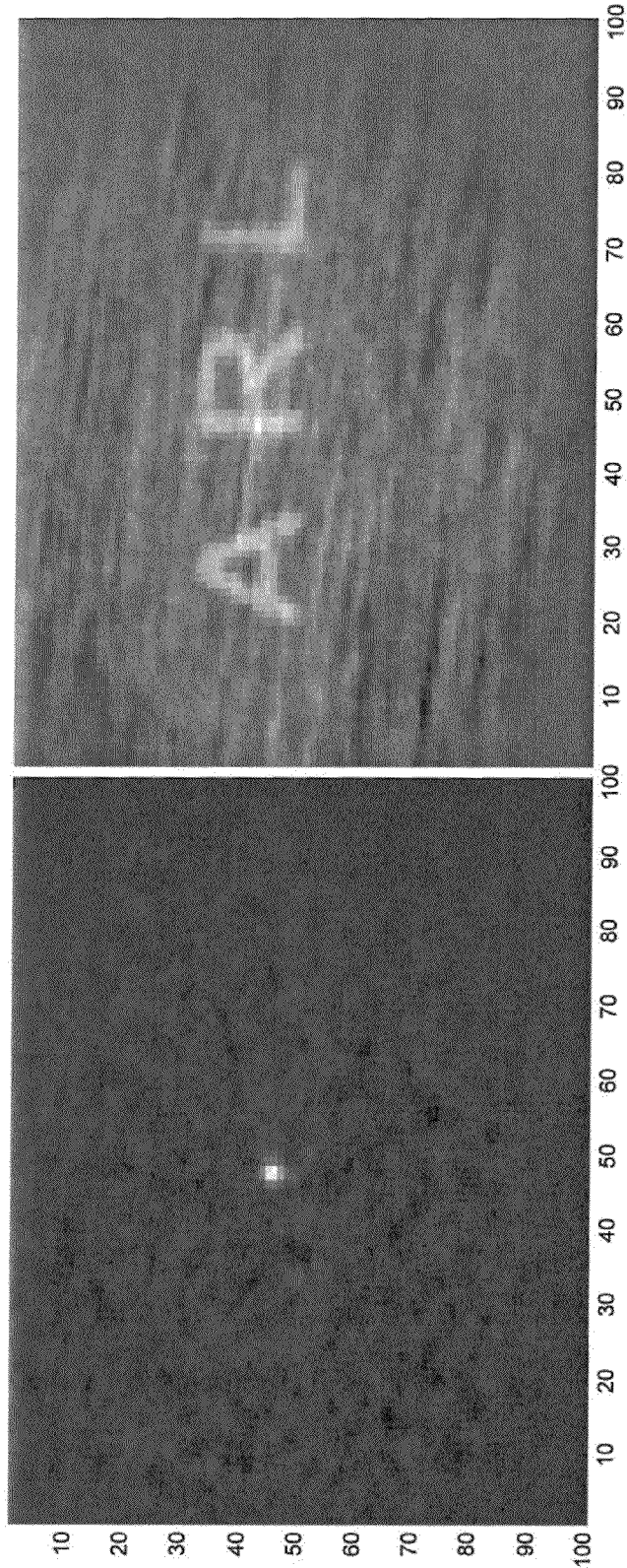
FIG. 8B Ghost Image
Computed using CS Techniques using the set of 2x2 pixel spatially averaged buckets and summed into a final Ghost Image.
FIG. 8A Sample
Single intermediate 2x2 bucket Ghost Image

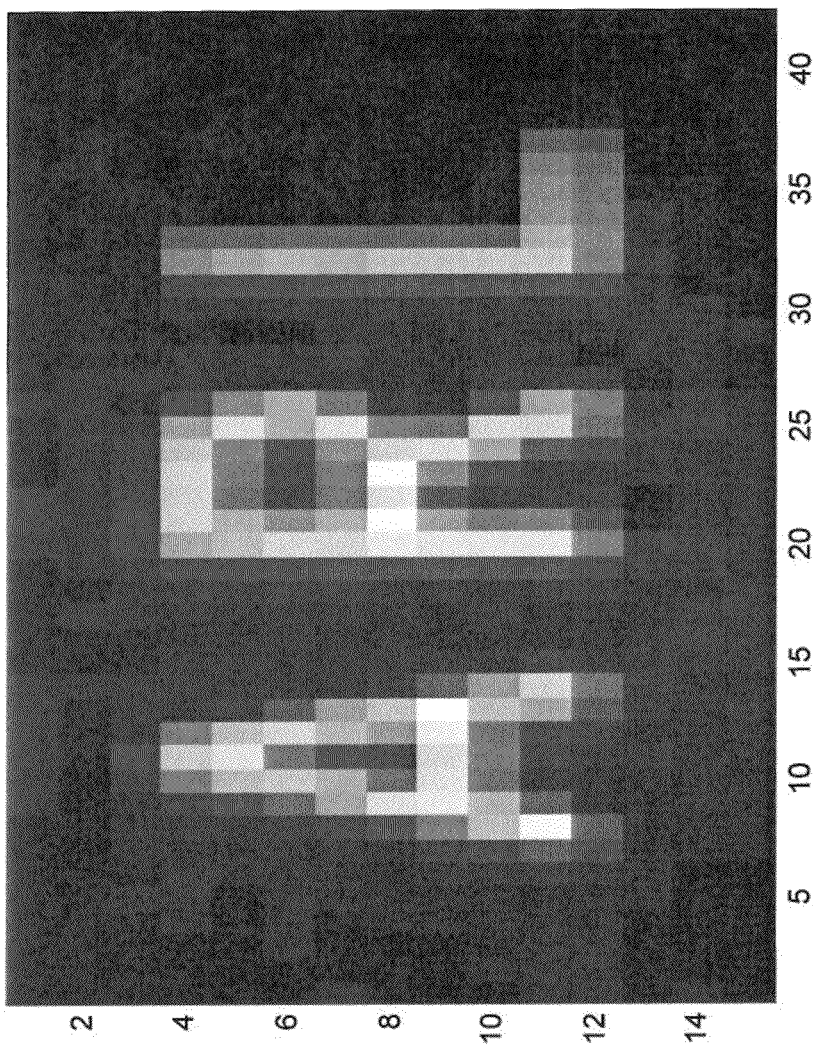
FIG. 9B 2x2 spatially averaged set of pixels of the target subject
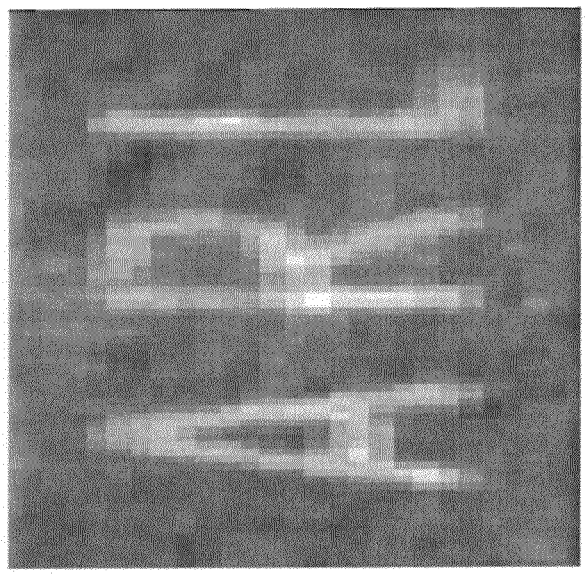
FIG. 9A 1x1 spatially averaged set of pixels of the target subject

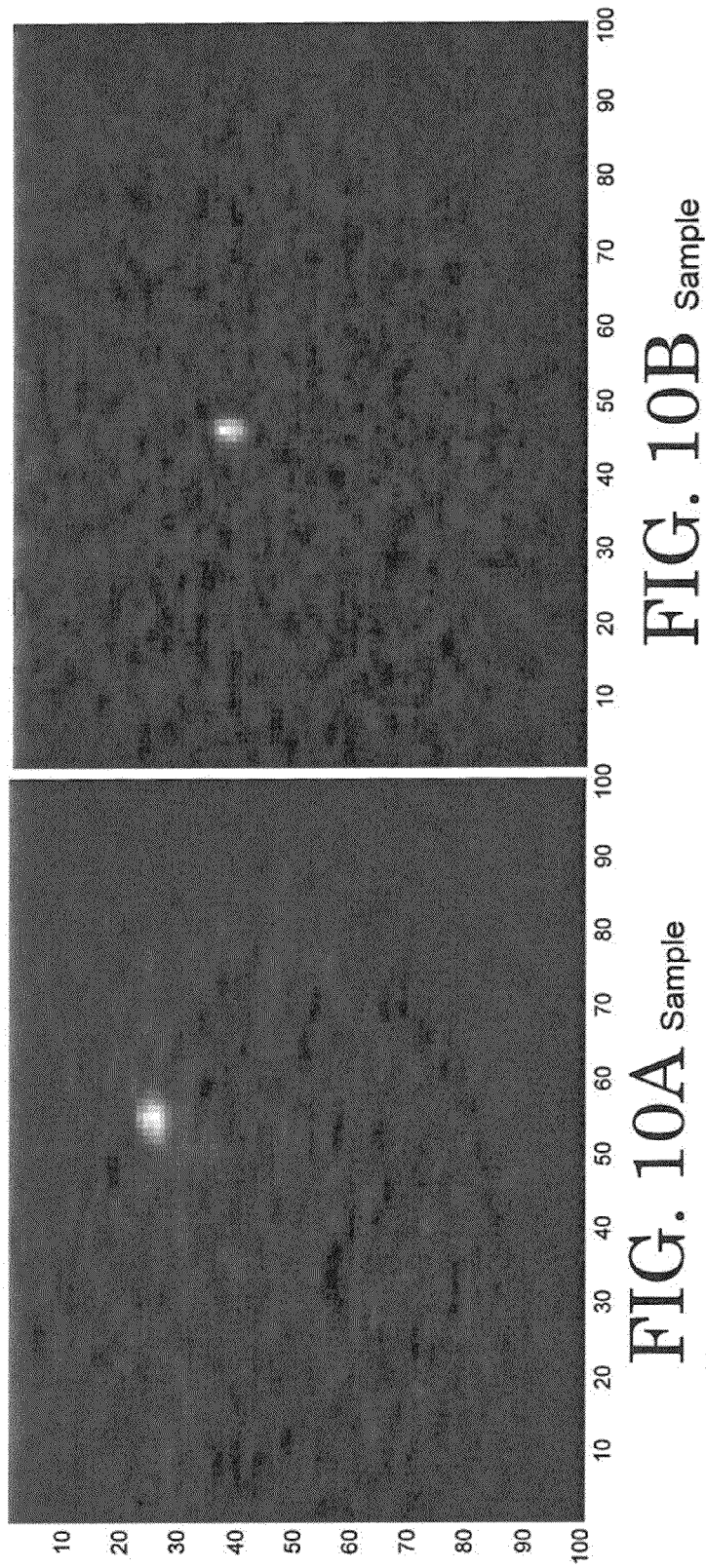

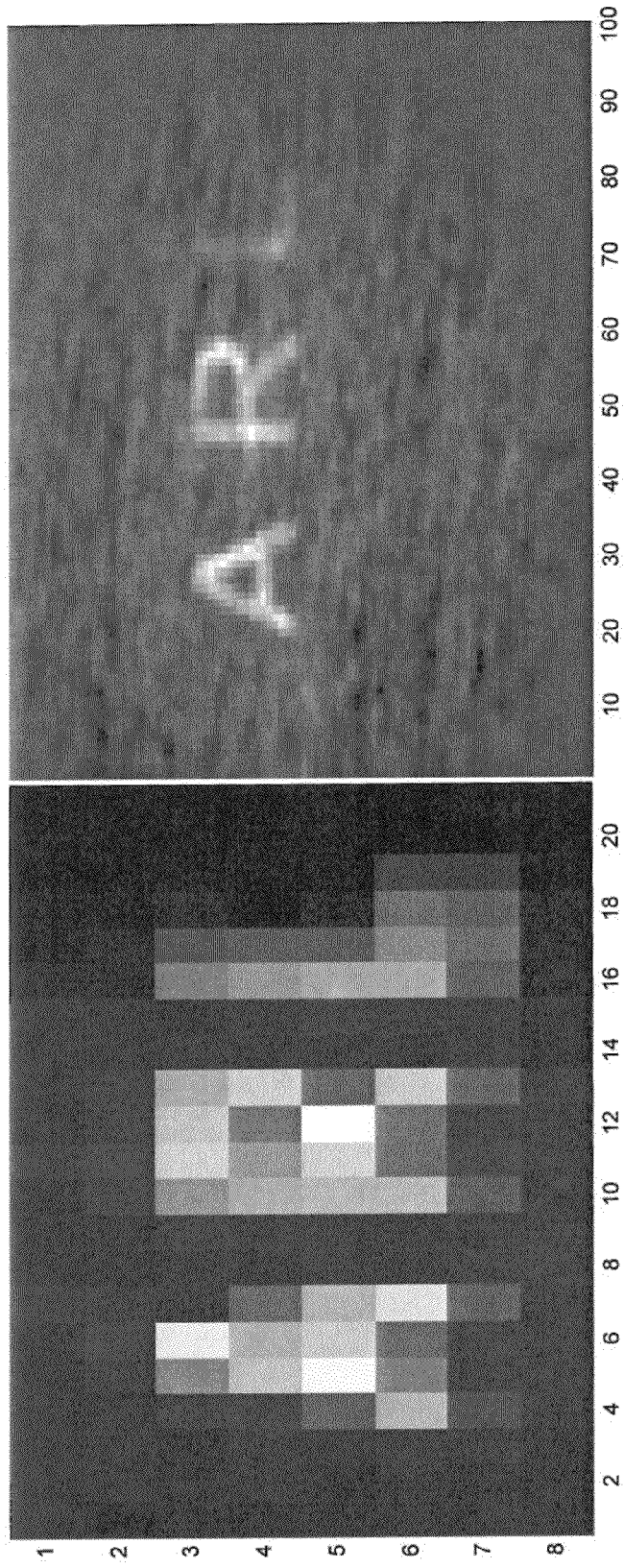
FIG. 11B Ghost Image
Computed using CS Techniques using the set of 4x4 pixel spatially averaged buckets and summed into a final Ghost Image.
FIG. 11A 4x4 spatially averaged set of pixels of the target subject

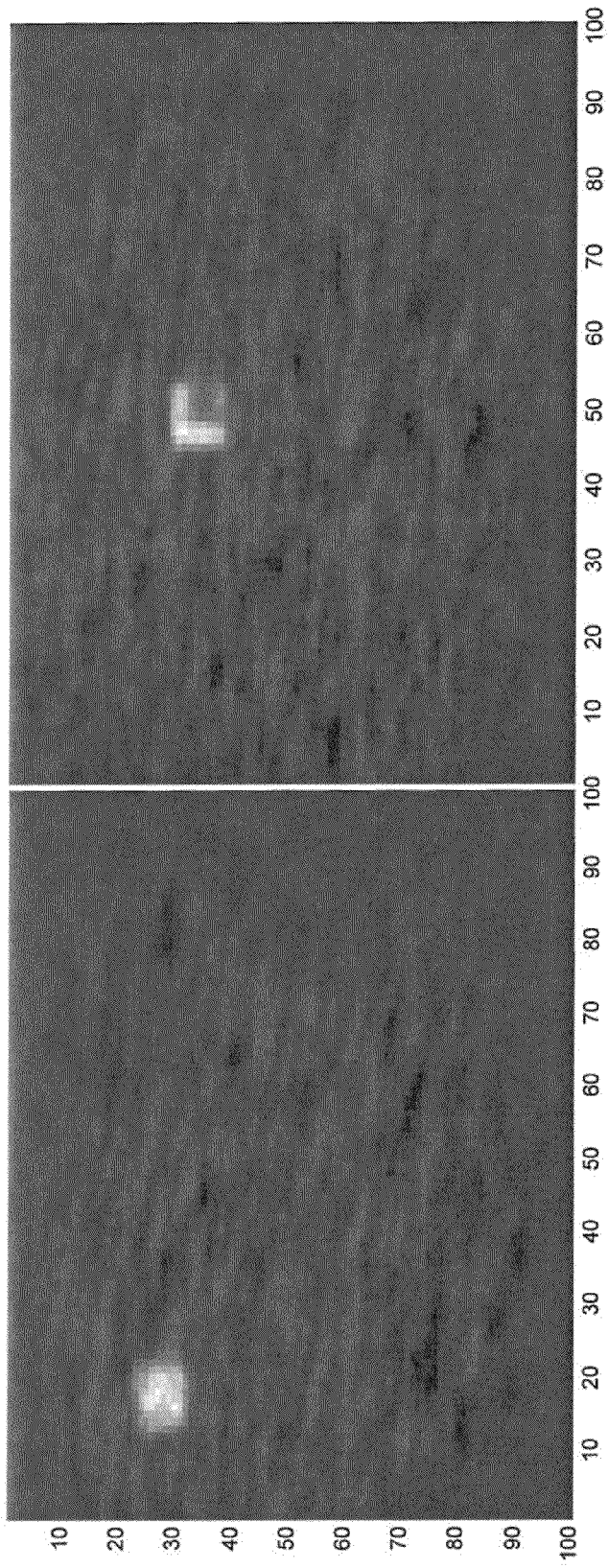
FIG. 12A Sample
Single intermediate 8x8 bucket
Ghost Image
FIG. 12B Sample
Single intermediate 8x8 bucket
Ghost Image

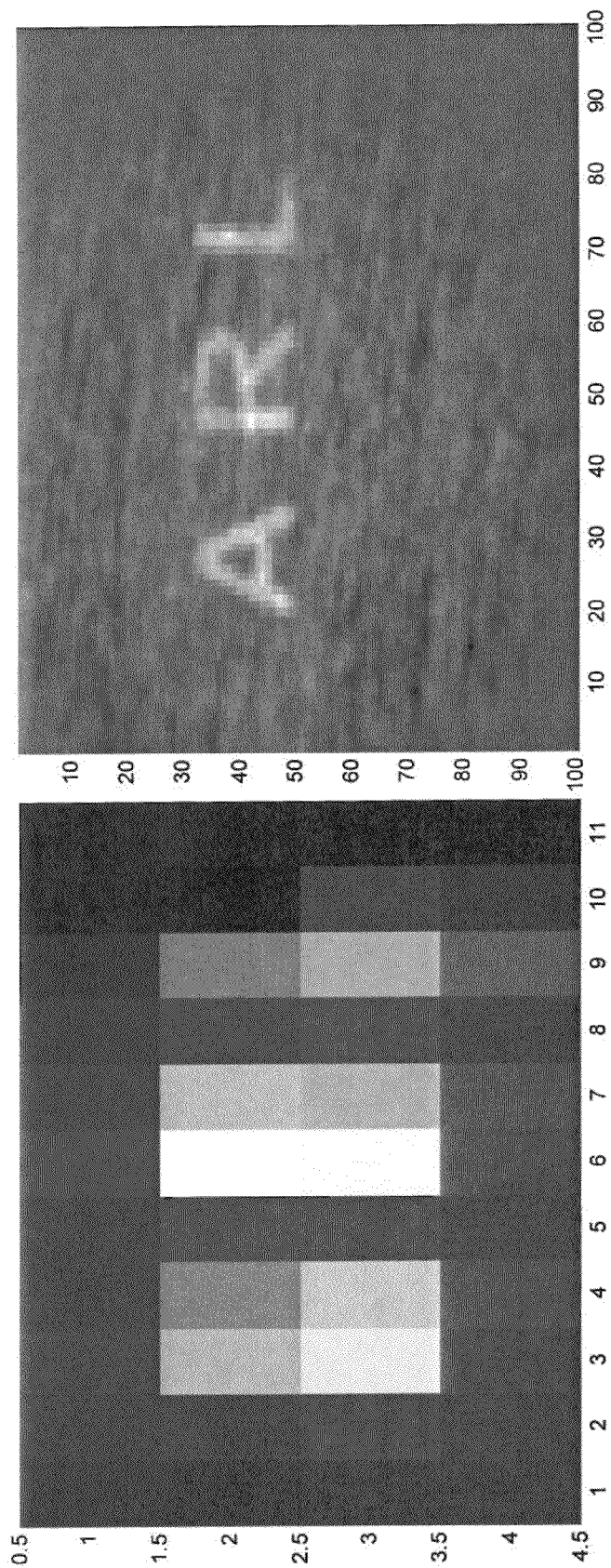
FIG. 13B Ghost Image
Computed using CS Techniques using the set of 8x8 pixel spatially averaged buckets and summed into a final Ghost Image.
FIG. 13A 8x8 spatially averaged set of pixels of the target subject

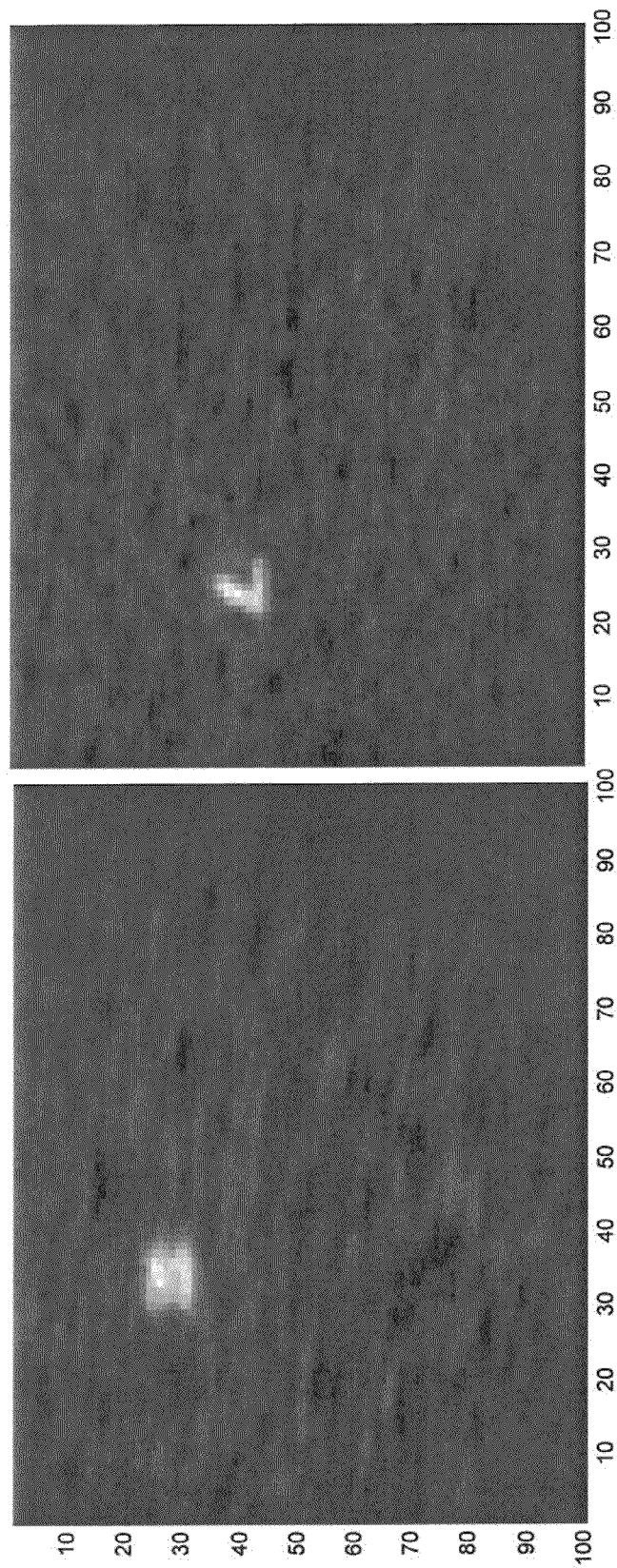
FIG. 14A Sample
Single intermediate, 8x8 with an overlap of 4, bucket Ghost Image
FIG. 14B Sample
Single intermediate, 8x8 with an overlap of 4, bucket Ghost Image

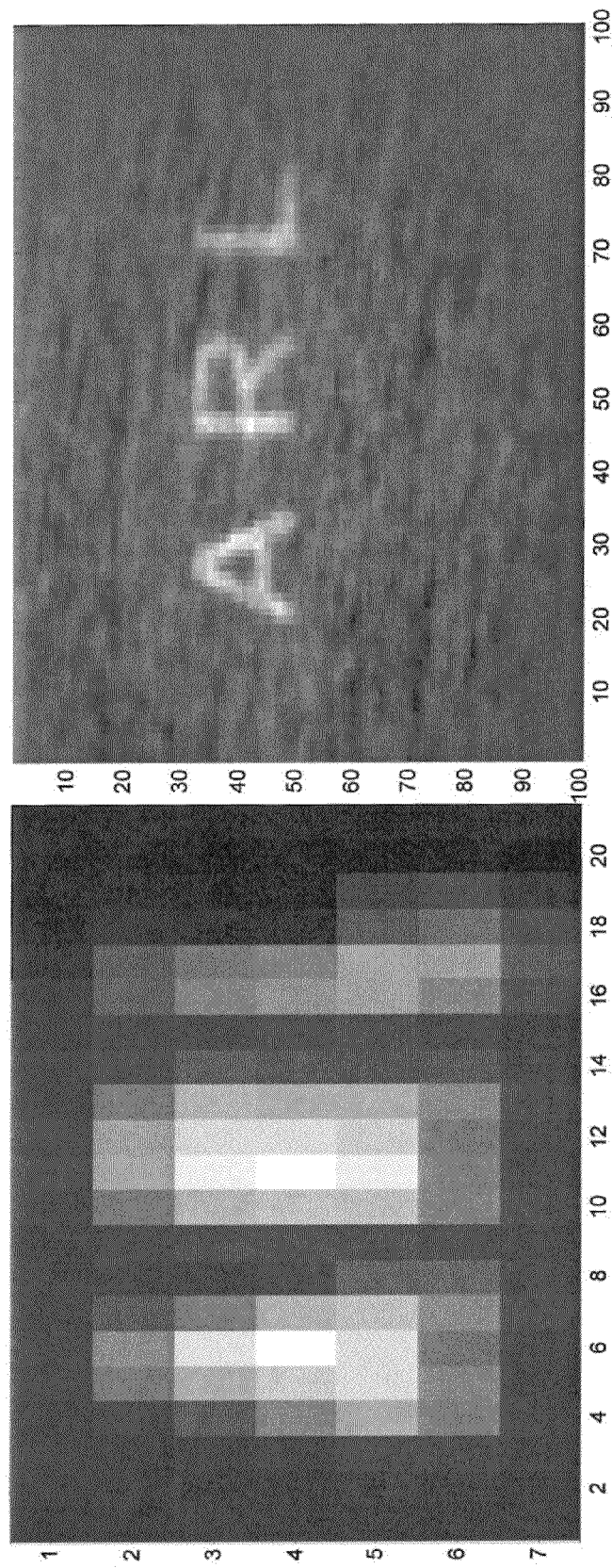
FIG. 15B Ghost Image
Computed using CS Techniques using the set of 8x8 overlap of 4 pixels spatially averaged buckets and summed into a final Ghost Image.
FIG. 15A 8x8 with overlap of 4 spatially averaged set of pixels of the target subject

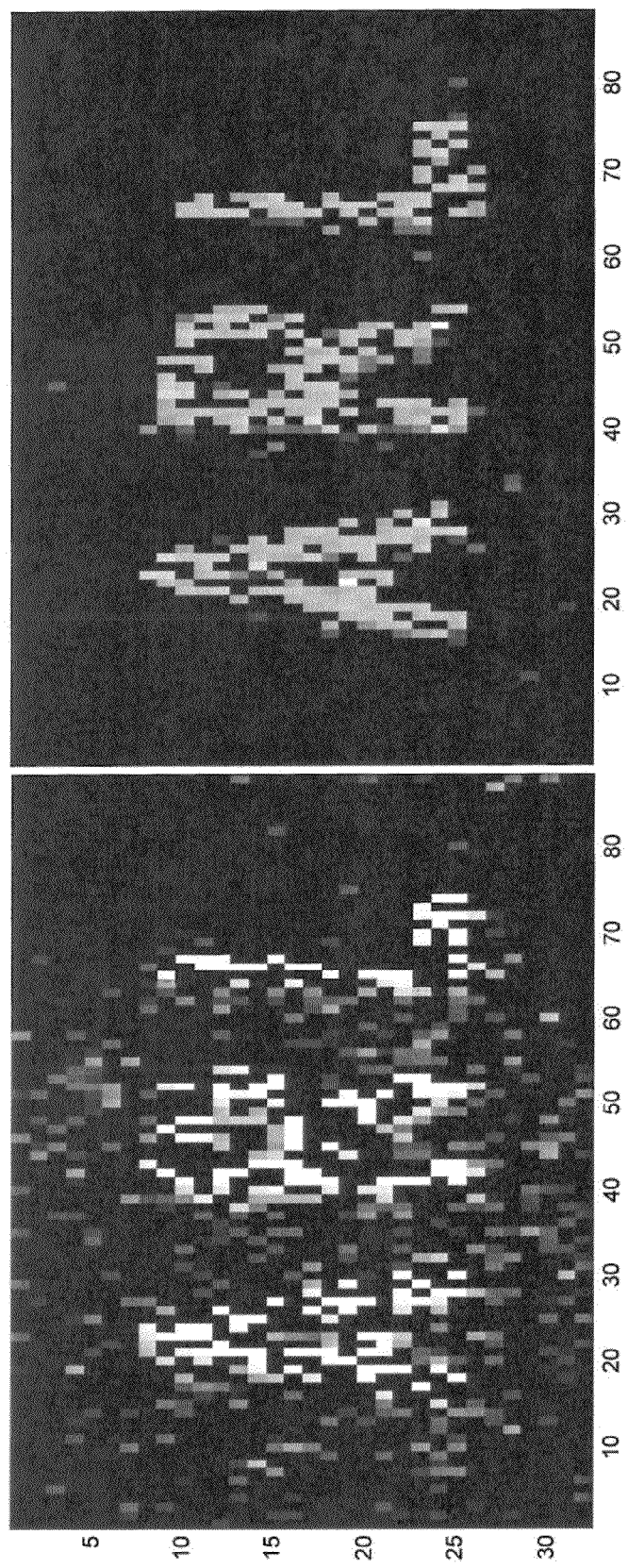
FIG. 16A Ghost
Image computed using CS techniques using 1400 shots with 1 randomly located pixel per shot
FIG. 16B Ghost
Image computed using CS techniques using 1400 shots with 2 randomly located pixel per shot

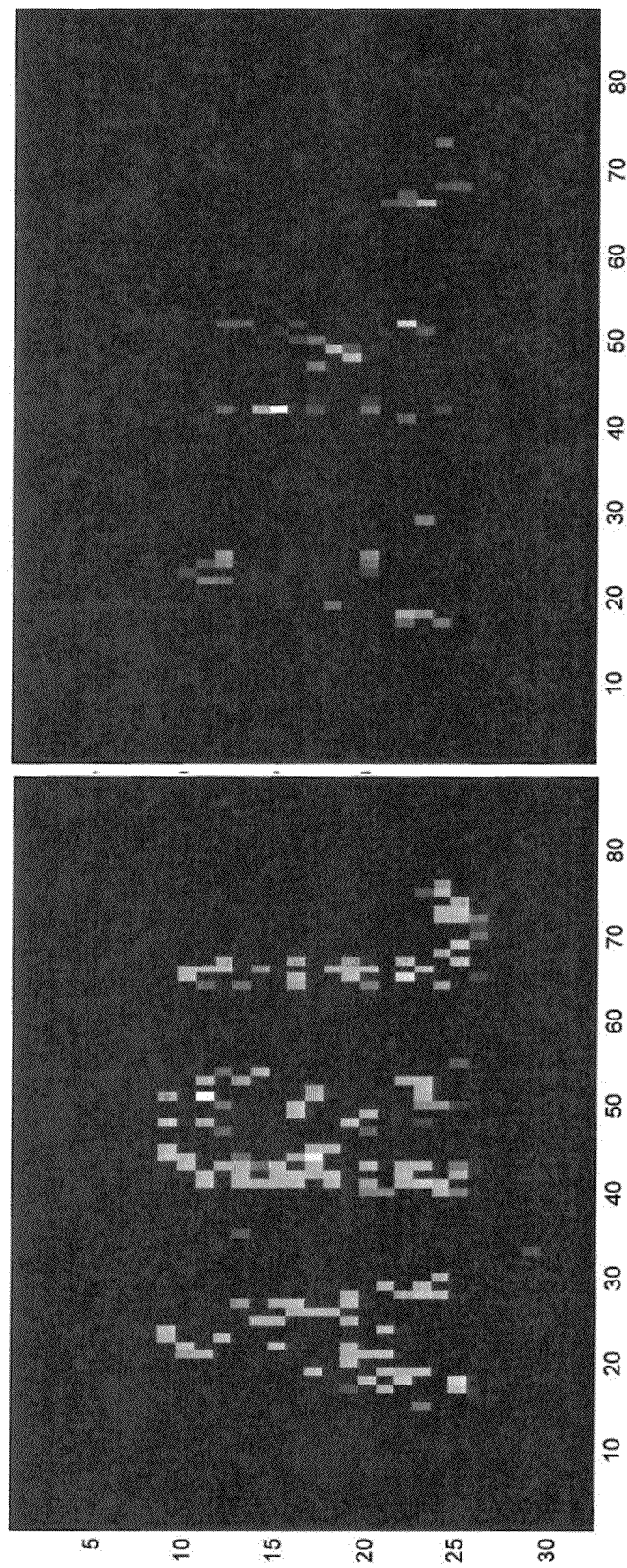
FIG. 17A Ghost
Image computed using CS techniques using 500 shots with 2 randomly located pixel per shot
FIG. 17B Ghost
Image computed using CS techniques using 10 shots with 1000 randomly located pixel per shot

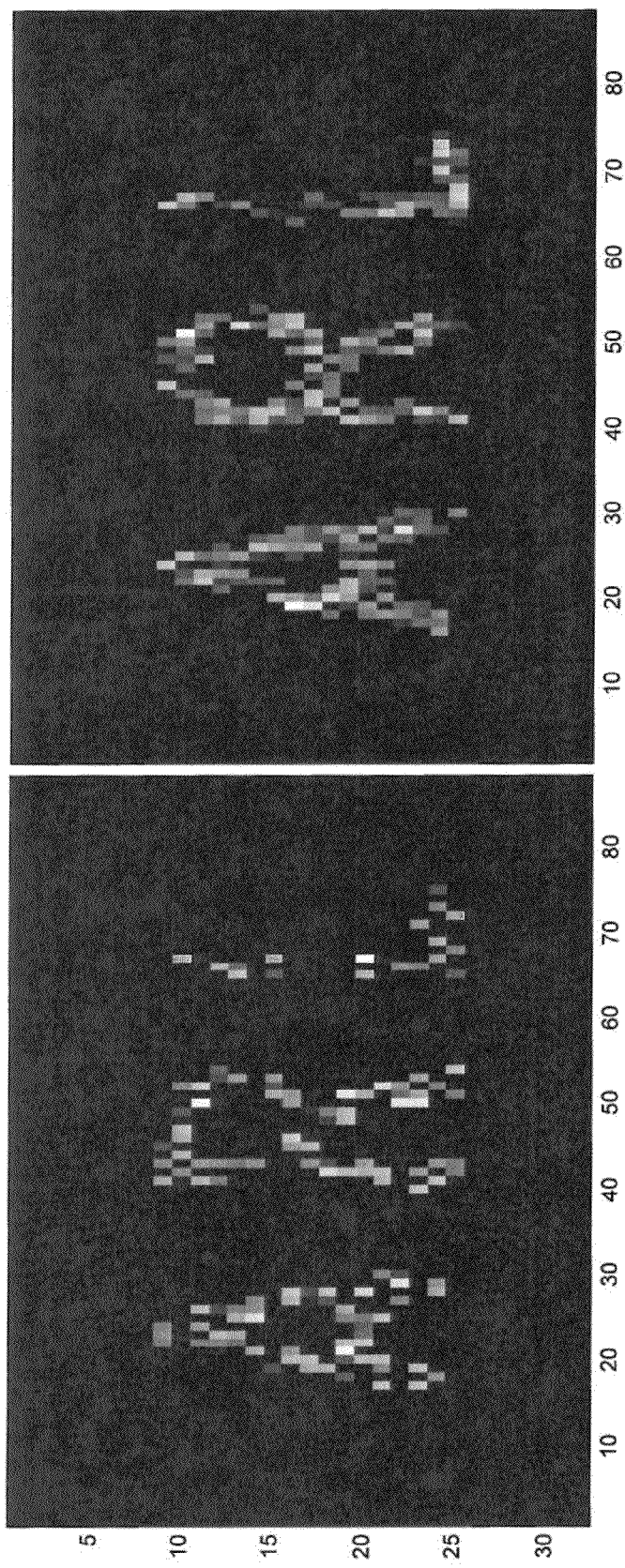
FIG. 18A Ghost
Image computed using CS techniques using 150 shots with 20 randomly located pixels per shot
FIG. 18B Ghost
Image computed using CS techniques using 150 shots with 100 randomly located pixels per shot

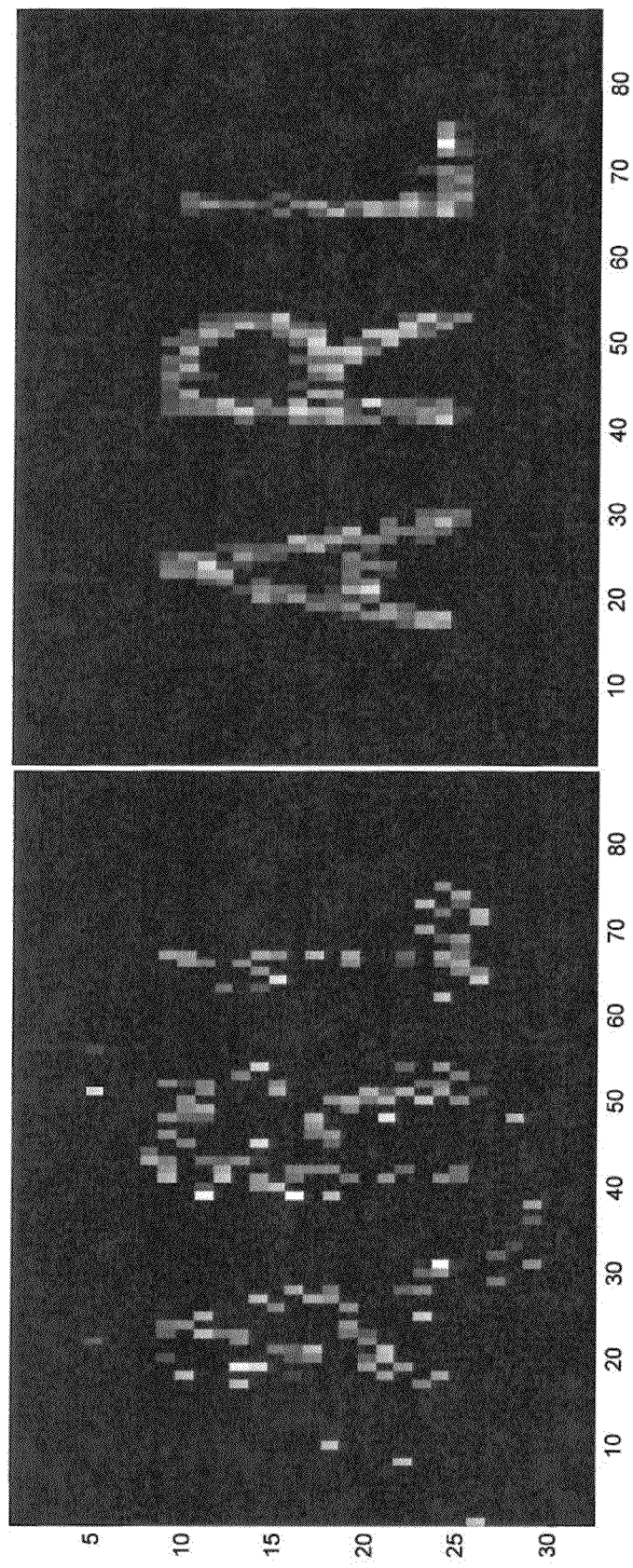
FIG. 19A Ghost
Image computed using CS techniques using 150 shots with 10 randomly located pixels per shot
FIG. 19B Ghost
Image computed using CS techniques using 150 shots with 1000 randomly located pixels per shot

IMAGE ENHANCEMENT SYSTEM AND METHOD

CROSS REFERENCE TO RELATED APPLICATIONS

This application is a Continuation-In-part application of application Ser. No. 13/247,470 entitled "System and Method for Image Enhancement" (ARL 11-03) by R. Meyers & K. Deacon, filed Sep. 28, 2011, and application Ser. No. 13/198, 133 entitled "Method and System for Non-line-of-sight Imaging" (ARL 10-31) filed Aug. 4, 2011, and issued on Feb. 12, 2013 as U.S. Pat. No. 8,373,107, which in turn claims priority of U.S. patent application Ser. No. 12/819,602 entitled "Method and System for LIDAR Utilizing Quantum Properties," filed Jun. 21, 2010 (ARL 09-35) and issued on Aug. 14, 2012 as U.S. Pat. No. 8,242,428, which in turn claims priority of U.S. application Ser. No. 12/330,401 (U.S. Pat. No. 7,812,303) (ARL07-33) entitled "Method and System for Creating an Image Using Quantum Properties of Light Based Upon Spatial Information From a Second Light Beam Which Does not Illuminate the Subject," filed Dec. 8, 2008, which claims priority to U.S. Provisional Patent Application Ser. No. 60/993,792 filed Dec. 6, 2007. The present application, through U.S. patent application Ser. No. 13/198, 133 (ARL 10-31) entitled "Method and System for Non-line-of-sight Imaging" and U.S. application Ser. No. 12/819,602 (ARL 09-35), entitled "Method and System for LIDAR Utilizing Quantum Properties," filed Jun. 21, 2010, also claims priority of U.S. patent application Ser. No. 12/343,384 filed Dec. 23, 2008, entitled "Method and System for Quantum Imaging Using Entangled Photons Pairs," now U.S. Pat. No. 7,847,234, issued Dec. 7, 2010 (ALR 09-15). The present application through application Ser. No. 13/198,133 claims the benefit of U.S. application Ser. No. 12/837,668 (ARL 07-33D) entitled "Method and System for Creating an Image Using the Quantum Properties of Sound or Quantum Particles, filed Jul. 16, 2010, now U.S. Pat. No. 8,053,715, which is a divisional application of U.S. Pat. No. 7,812,303. All of the patent applications and patents mentioned in this paragraph are hereby incorporated by reference.

STATEMENT OF GOVERNMENT INTEREST

The embodiments herein may be manufactured, used, and/or licensed by or for the United States Government without the payment of royalties thereon.

BACKGROUND OF THE INVENTION

Image processing is a form of signal processing for which the input is an image, such as, for example, a photograph or video frame, and the output is either an image (or series of images) or a set of characteristics or parameters related to the image (or series of images). Forms of image processing include, for example, face detection, feature detection, medical image processing, computer vision (extraction of information from an image by a computer), microscope image processing, etc.

Image resolution relates to the detail that an image possesses. For satellite images, the resolution generally correlates to the area represented by each pixel. Generally speaking, an image is considered to be more accurate and detailed as the area represented by each pixel is decreased. As used herein, the term images include digital or analog images, film images, and/or other types of images. When an image is captured by a monochrome camera, a single charge-coupled device (CCD) or complementary metal-oxide semiconductor (CMOS) sensor is used to form an image via the light intensity projected onto the sensor. Cameras taking pictures from great distances, such as aerial photos, may not obtain detailed information about the subject matter. Also, the taking of photographs may be subject to motion of the camera and/or jitter. Consequently, subtle or detail information are not present in the images.

Quantum imaging is a relatively new science that is developing new technology such as Quantum Ghost Imaging (QGI) to exploit quantum optical information. The imaging is adaptable to adverse imaging situations and there is a benefit to exploiting quantum optical information to image objects through partially obscuring media, i.e., optical turbulence, obstructions, smoke, and fog. Imaging through obscuring media is difficult; such as the difficulty of driving in foggy weather.

Quantum entanglement is a quantum mechanical phenomenon in which the quantum states of two or more quantum particles are linked together such that the quantum state of one quantum particle appears to interact with its counterpart; even though the individual quantum particles may be spatially separated. This apparent interconnection leads to correlations between observable physical properties of remote systems, since the interaction of the remote system with quantum state of one of a pair can be observed though observation of the counterpart. For example, according to quantum mechanics, the spin of a quantum particle is indeterminate until such time as some physical intervention is made to measure the spin; which, in general, could equally be spin-up or spin-down. However, when two members of a spin entangled pair are measured, they will either be correlated or anti-correlated using spin measurements, regardless of the distance between the two particles. It is normally taught in quantum theory that no hidden variable theory can account for these results of quantum mechanics. The statistics of multiple measurements must generally relate to an inequality (called Bell's inequality), which is violated both by quantum mechanical theory and experimental results.

The non-classical two-photon interaction or quantum entanglement was described by Albert Einstein et al. (Einstein, Podolsky, Rosen (hereinafter Einstein, et al.) paradox), "Can Quantum-Mechanical Description of Physical Reality Be Considered Complete?" Physical Review, Volume 47, May 15, 1935, pgs. 777-800 The paradox of quantum entanglement, as described therein, relates to the concept that as a result of the process of measurement of a first system, using quantum mechanics, two different physical quantities are obtainable in the second system, despite the fact that at the time of the measurements, the two systems no longer interact and the second system is not disturbed in any way by the first. Einstein, et al, were unable to reconcile this quantum mechanical description of reality with the so-called classical physics determination that no "real" change can take place in the second system as a consequence of anything that may be done to the first system after the two systems no longer interact.

The theoretical work reported by Klyshko in "Combined EPR and Two-Slit Experiments: Interference of Advanced Waves", Physics Letters A, Volume 132, number 6.7, pp. 299-304 (1988) see also, Soy. Phys. Usp. 31, 74 suggested a non-classical two-photon interaction could exist.

The first two-photon imaging experiment was reported by Pittman et al., in "Optical Imaging by Means of Two-photon Quantum Entanglement," Physical Review, A, Vol. 52, No. 5, November 1995. According to the Pittman article, a two-photon optical imaging experiment was performed to test the two-particle entanglement as described by Albert Einstein et al., referenced above, to determine if there was a correlation in position and in momentum for an entangled two-photon system; using "test beam or path" and "reference beam or path" photon pairs. Specifically, an aperture placed in front of a fixed detector was illuminated by a signal beam through a convex lens. A sharp magnified image of the aperture was found in the coincidence counting rate when a mobile detector was scanned in the transverse plane of the reference beam at a specific distance in relation to the lens. The experiment was named "ghost imaging" due to its surprising nonlocal feature.

Additional experiments are reported in Pittman, et al. "Optical Imaging by Means of Two-Photon Entanglement," Phys. Rev. A, Rapid Comm., Vol. 52, R3429 (1995) and ghost interference by Strekalov, et al, "Observation of Two-Photon 'Ghost' Interference and Diffraction," Phys. Rev. Lett., Vol. 74, 3600 (1995), which together stimulated the foundation of quantum imaging in terms of multi-photon geometrical and physical optics.

The above publications are merely examples of the development and attempt to understand the science of quantum mechanics as it relates to photons. The present invention in effect uses similar principles and extensions thereof relating to quantum interactions.

SUMMARY OF THE INVENTION

An embodiment of the present invention enhances or increases the image quality of an object or scene as "seen" or recorded by a detector. When a low quality detector is aimed at an object, a high quality image is generated using the quantum properties of light. A low quality detector picks up quantum information on the object shape and its temporal relations to reference fields acting as a collection of bucket detectors that do not individually contain spatial information. The reference fields are recorded by a high resolution imager (CCD, camera, etc.) that images the source of light that illuminates the target object.

Current imaging methods are limited to the quality of the detector looking at the object being imaged. A preferred embodiment generates an improved quality image of the object without the object being imaged in high resolution directly. The preferred method may be used in connection with photographs taken during turbulent conditions. The current invention may be further directed towards overcoming a limitation that exists in current quantum ghost imaging embodiments wherein there exists a lack of a means to accurately direct the bucket detector or detectors to receive photons from a distant subject.

A preferred methodology comprises the following steps not necessarily in sequential order: providing a series of low resolution frames of a given region of interest and a series of high resolution images of a light source; determining the value of each pixel at each location within each high resolution frame and within each low resolution frame to form first and second arrays, respectively, of pixel values; determining the product of the first array of pixel values and the second array of pixel values; determining the sum of the products by adding together the products of first array of pixel values and second array of pixel values for a series of frames; determining the average of the sum of products by dividing the sum of products by the number of frames in the series of frames to form an average high resolution frame times low resolution pixel product; determining the average value of each pixel at each pixel location for the series of high resolution frames to form a third array of average pixel values; determining the average values at each pixel location for the series of low resolution frames to form a fourth array; and, for each pixel location in the low resolution frame:

determining a fifth array of products of the low resolution pixel location times each pixel in each high resolution image for the series of frames;

summing the third arrays for the series of frames and dividing by the number of frames in the series to form a sixth array comprising the average product of the low resolution pixel location times the high resolution frames;

determining the product of the third array times the value at the low resolution pixel location of the fourth array to form a seventh array;

determining an intermediate image for the pixel location in the low resolution frame by subtracting the seventh array from the sixth array to form an eighth array;

summing together the eighth arrays to provide a final composite high resolution image.

A preferred embodiment is directed to a system of enhancing low resolution images by using high resolution images of the illuminating source that illuminates the low resolution images comprising: at least one processor; a high resolution spatial detector; an array of pixel locations; a light source which emits entangled photons pairs, the first photons of the photon pairs being reflected off a target to into an array of pixel locations to create a series of low resolution images; the second photons of the photon pairs being inputted into a high resolution spatial detector; the second photons not being reflected from or passing through the target; coincidence circuitry that transmits the measurements from the array of pixel locations and the high resolution spatial detector to the at least one processor at specific instances in time; whereby the at least one processor enhances the low resolution images recorded at the array of pixel locations using the first photons by combining the low resolution measurements with the high resolution measurements detected by the high resolution spatial detector using the second photons.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The present invention can be better understood when reading the following detailed description with reference to the accompanying drawings, which are incorporated in and form a part of the specification, illustrate alternate embodiments of the present invention, and together with the description, serve to explain the principles of the invention. In the drawings:

FIG. 7A is an illustration of an image constructed using a bucket that consisted of all of the pixels of a simulated low-resolution multiple photo-sensor bucket array as the bucket measurement.

FIG. 7B an illustration of an intermediate image constructed using a single bucket consisting of 2×2 pixels of a simulated low-resolution multiple photo-sensor bucket array.

FIG. 8A is an illustration of an intermediate image constructed using a single bucket consisting of 2×2 pixels of a simulated low-resolution multiple photo-sensor bucket array.

FIG. 8B is an illustration of a final composite image produced by the sum of all the intermediate images using a set of buckets consisting of 2×2 pixels of a simulated low-resolution multiple photo-sensor bucket array.

FIG. 9A is an illustration of an average image measured by a multiple photo-sensor bucket array.

FIG. 9B is an illustration of an average image measured by a low-resolution multiple photo-sensor bucket array simulated by 2×2 pixel spatial averaging.

FIG. 10A is an illustration of an intermediate image constructed using a single bucket consisting of 4×4 pixels of a simulated low-resolution multiple photo-sensor bucket array.

FIG. 10B is an illustration of an intermediate image constructed using a single bucket consisting of 4×4 pixels of a simulated low-resolution multiple photo-sensor bucket array.

FIG. 11A is an illustration of an average image measured by a low-resolution multiple photo-sensor bucket array simulated by 4×4 pixel spatial averaging.

FIG. 11B is an illustration of a final composite image produced by the sum of all the intermediate images using a set of buckets consisting of 4×4 pixels of a simulated low-resolution multiple photo-sensor bucket array.

FIG. 12A is an illustration of an intermediate image constructed using a single bucket consisting of 8×8 pixels of a simulated low-resolution multiple photo-sensor bucket array.

FIG. 12B is an illustration of an intermediate image constructed using a single bucket consisting of 8×8 pixels of a simulated low-resolution multiple photo-sensor bucket array.

FIG. 13A is an illustration of an average image measured by a low-resolution multiple photo-sensor bucket array simulated by 8×8 pixel spatial averaging.

FIG. 13B is an illustration of a final composite image produced by the sum of all the intermediate images using a set of buckets consisting of 8×8 pixels of a simulated low-resolution multiple photo-sensor bucket array.

FIG. 14A is an illustration of an intermediate image constructed using a single bucket consisting of 8×8 with overlap of 4 pixels of a simulated low-resolution multiple photo-sensor bucket array.

FIG. 14B is an illustration of an intermediate image constructed using a single bucket consisting of 8×8 with overlap of 4 pixels of a simulated low-resolution multiple photo-sensor bucket array.

FIG. 15A is an illustration of an average image measured by a low-resolution multiple photo-sensor bucket array simulated by 8×8 with overlap of 4 pixel spatial averaging.

FIG. 15B is an illustration of a final composite image produced by the sum of all the intermediate images using a set of buckets consisting of 8×8 overlap of 4 pixels of a simulated low-resolution multiple photo-sensor bucket array.

FIG. 16A is an illustration of a final composite image produced by the sum of all the intermediate images using a set of buckets simulating a low resolution multiple photo-sensor bucket array that consisted of 1 randomly spatially located pixel for 1400 shots.

FIG. 16B is an illustration of a final composite image produced by the sum of all the intermediate images using a set of buckets simulating a low resolution multiple photo-sensor bucket array that consisted of 2 randomly spatially located pixels for 1400 shots.

FIG. 17A is an illustration of a final composite image produced by the sum of all the intermediate images using a set of buckets simulating a low resolution multiple photo-sensor bucket array that consisted of 2 randomly spatially located pixels for 500 shots.

FIG. 17B is an illustration of a final composite image produced by the sum of all the intermediate images using a set of buckets simulating a low resolution multiple photo-sensor bucket array that consisted of 1000 randomly spatially located pixels for 10 shots.

FIG. 18A is an illustration of a final composite image produced by the sum of all the intermediate images using a set of buckets simulating a low resolution multiple photo-sensor bucket, array that consisted of 20 randomly spatially located pixels for 150 shots.

FIG. 18B is an illustration of a final composite image produced by the sum of all the intermediate images using a set of buckets simulating a low resolution multiple photo-sensor bucket array that consisted of 100 randomly spatially located pixels for 150 shots.

FIG. 19A is an illustration of the final composite image produced by the sum of all the intermediate images using a set of buckets simulating a low resolution multiple photo-sensor bucket array that consisted of 10 randomly spatially located pixels for 150 shots.

FIG. 19B is an illustration of the final composite image produced by the sum of all the intermediate images using a set of buckets simulating a low resolution multiple photo-sensor bucket array that consisted of 1000 randomly spatially located pixels for 150 shots.

DETAILED DESCRIPTION OF PREFERRED EMBODIMENTS

Figure 1:
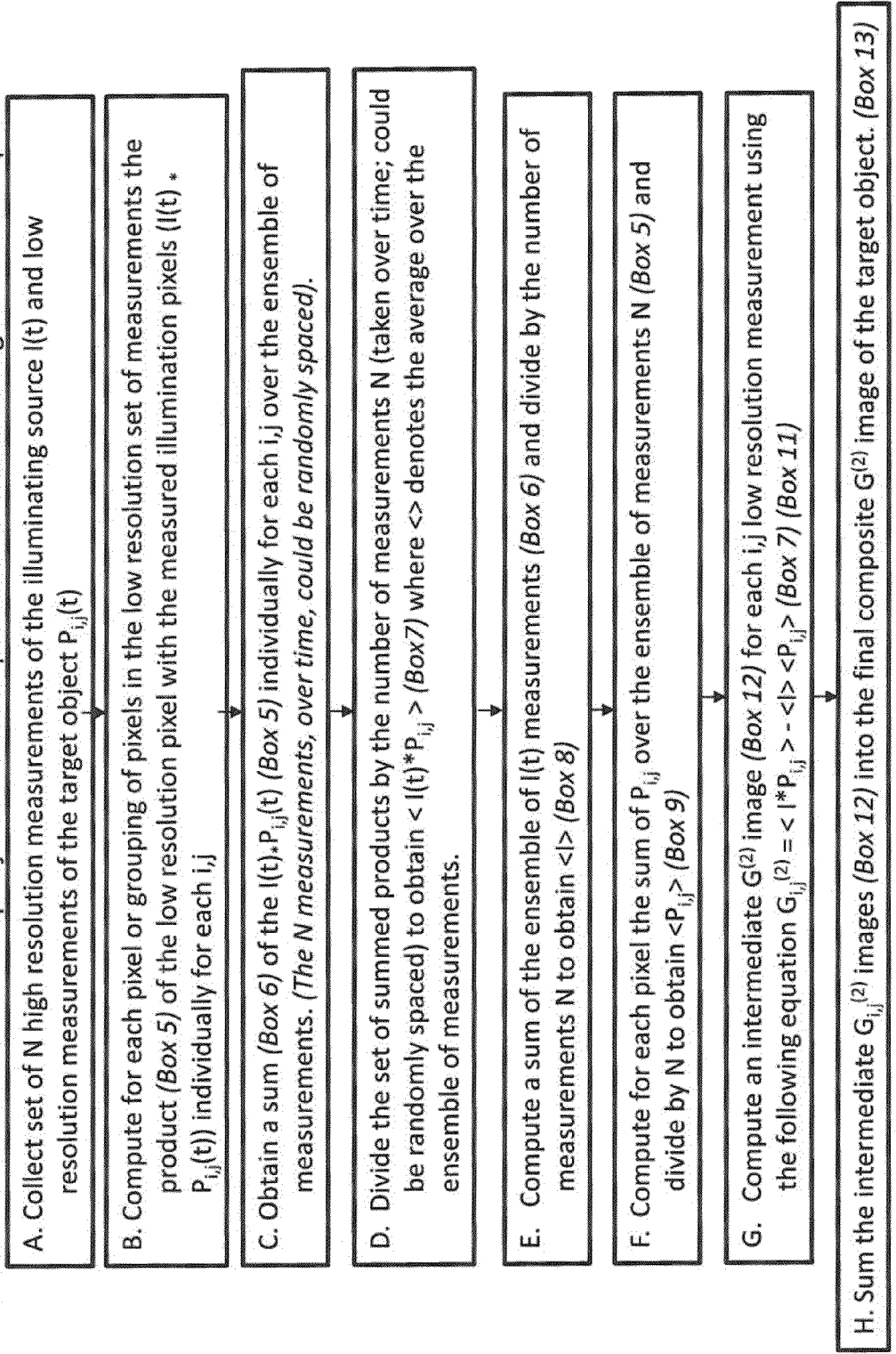
FIG. 1 is an illustration a flow chart for performing a preferred method of practicing the present invention.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. For example, when referring first and second photons in a photon pair, these terms are only used to distinguish one element, component, region, layer or section from another region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Furthermore, the term "outer" may be used to refer to a surface and/or layer that is farthest away from a substrate.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will also be appreciated by those of skill in the art that references to a structure or feature that is disposed "adjacent" another feature may have portions that overlap or underlie the adjacent feature.

A preferred embodiment system for image enhancement comprises at least one processor and at least one memory operatively associated with the at least one processor. As illustrated in FIG. 1, a preferred methodology for resolution improvement performed by the at least one processor comprises the following steps not necessarily in the order recited:

A. Collect a set of N high resolution measurements of the illuminating source I(t) and low resolution measurements of the target object P(t).

B. Compute for each pixel or grouping of pixels in the low resolution set of measurements the product of the low resolution pixel with the measured illumination pixels $I(t)*P_{i,j}(t)$ individually for each i,j.

C. Obtain a sum of the $I(t)*P_{i,j}(t)$ individually for each i,j over the ensemble of measurements.

D. Divide the set of summed products by the number of measurements N to obtain $<I(t)*P_{i,j}(t)>$ where $<\,>$ denotes the average over the ensemble of measurements.

E. Compute a sum of the ensemble of I(t) measurements and divide by the number of measurements N to obtain $<I(t)>$.

F. Compute for each low resolution pixel the sum of $P_{i,j}$ over the ensemble of measurements N and divide by N to obtain $<P_{i,j}>$.

G. Compute an intermediate $G^{(2)}$ image for each i,j low resolution measurement using the following equation $G_{i,j}^{(2)} = <I*P_{i,j}> - <I><P_{i,j}>$.

H. Sum the intermediate $G_{i,j}^{(2)}$ images into the final composite $G^{(2)}$ image of the target object, $Image_{final} = \Sigma G_{i,j}^{(2)}$ Note that the steps in FIG. 1 are comparable to the numbered boxes in FIGS. 2 and 3, as denoted by the reference to "Box _" correlating to the Box number of FIGS. 2 and 3.

Figure 2:
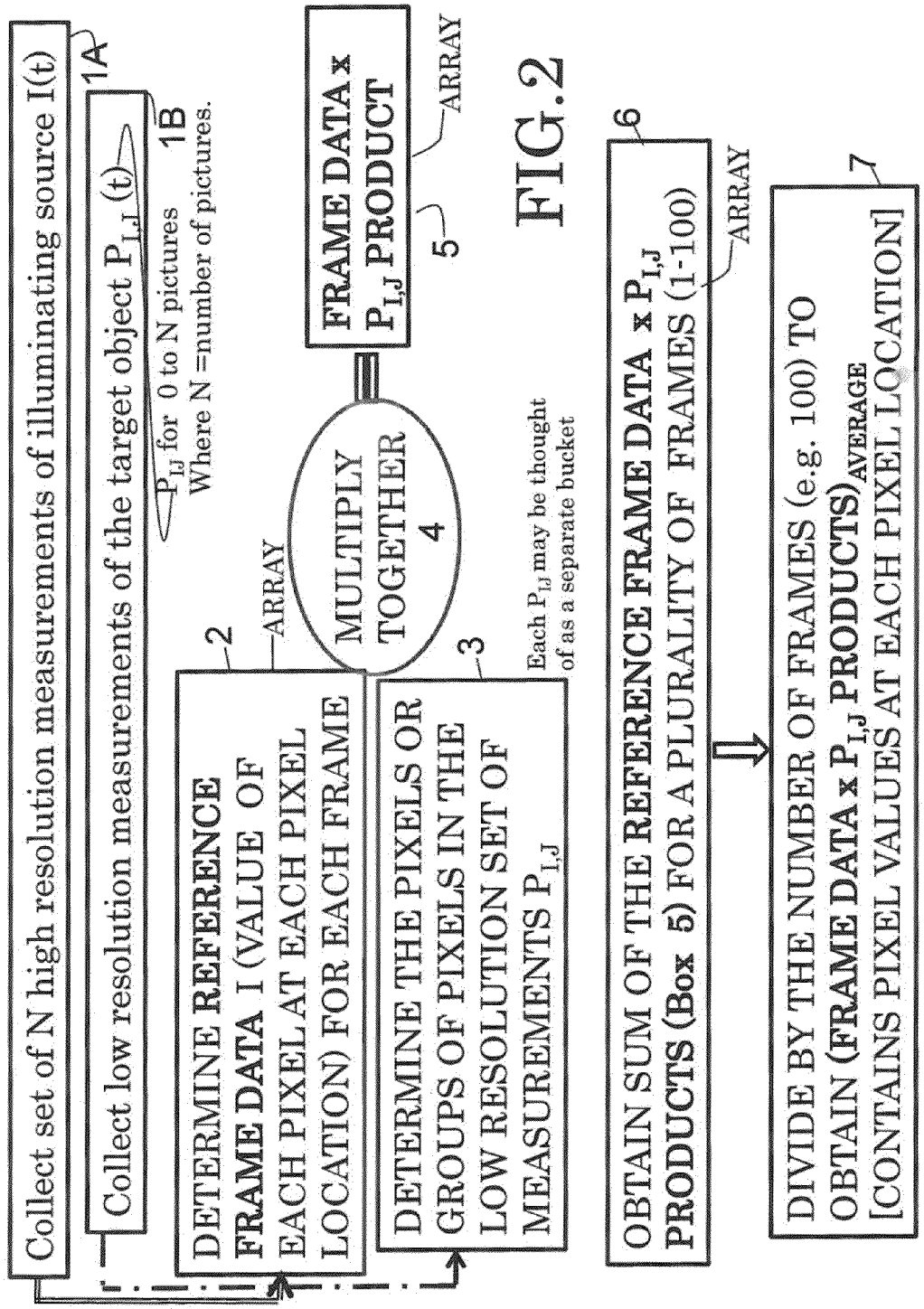
FIG. 2 is a partial schematic block diagram illustration of the steps for performing a preferred method of the present invention.

Referring now to FIG. 2, in accordance with a preferred methodology, in Box 1 a series or collection of high resolution measurements (or frames) of the illuminating light source (which may be, for example, the sun) are inputted into the memory or input of a processor or image processor. As used herein the terminology "processor" or "image processor" as used in the following claims includes a computer, multiprocessor, CPU, minicomputer, microprocessor or any machine similar to a computer or processor which is capable of processing algorithms.

In Box 2, using the input from Box 1, the frame data or value of each pixel at each pixel location is determined for each frame. In Box 3, the pixel values in the low resolution set of measurements $P_{i,j}$ is determined. The low resolution frames may comprise photographs of the same region of interest. The region of interest may be a scene, landscape, an object, a subject, person, or thing. Where the low resolution source is a low resolution camera, the value of a pixel correlates to a "bucket value" determination and correlates to the light intensity measured by the detector. In the case of an electronic display formed by pixels, the intensity of each pixel value at each pixel location $P_{i,j}$ is determined. At Box 4, the values in Box 2 are multiplied by the values determined in Box 3. Box 5 represents the Frame Data×$P_{i,j}$ Product. Inasmuch as the Boxes 2 and 3 are arrays of pixel values, the Box 5 Product is also an array of values. At Box 6, the products of Box 5 are repeatedly calculated for each frame in a selected plurality of frames and summed together. As an example, one hundred frames may be selected. At Box 7, the summation Box 6 (Products for the determined in Box 6) is divided by the number of frames (such as for example one hundred) to determine the Frame Data×$P_{i,j}$ Products Average for the plurality of frames. The Product Average in Box 7 is an array containing pixel values at each pixel location within the frame.

Figure 3:
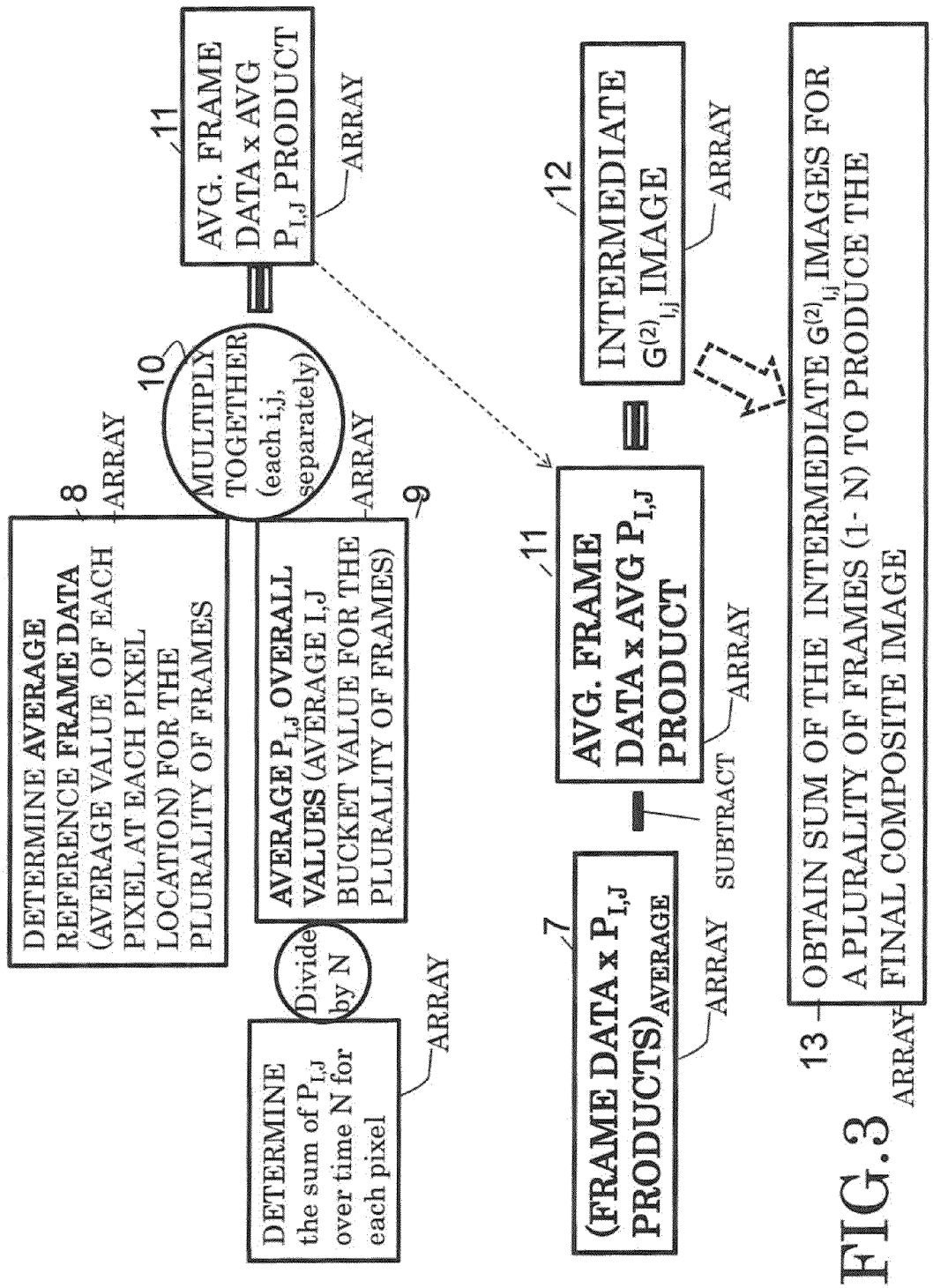
FIG. 3 is a partial schematic block diagram illustration of the steps for performing a preferred method of the present invention. Taken together, FIGS. 1, 2, and 3 outline the steps of a preferred methodology for the present invention.

FIG. 3 is a continuation of FIG. 2 and is a further description of a preferred methodology of the present invention. Note that Box 7 is carried over from FIG. 2 into FIG. 3. In Box 8, the average frame data (or average value of each pixel at each pixel location) is determined for the plurality of frames (e.g. 100) by averaging the pixel values at each pixel location for the plurality of frames to determine an array of average pixel values. In Box 9A the sum of $P_{ij}$ over time N for each pixel is determined. $P_{ij}$ represents the pixel location within each frame of the low resolution images (or bucket detector values). Prior to Box 9B, the result of Box 9A is divided by N. In Box 9B, the average $P_{ij}$ for the plurality of low resolution frames is determined. This correlates to the average of the light intensity of each pixel at each pixel location $P_{ij}$ in the set of frames N. In the case of a picture, the correlates to the reflected illumination at each pixel location $P_{ij}$. In the case of an electronic display formed by pixels, the average pixel intensity or pixel value at each pixel location is determined.

Box 10 represents the multiplication of Boxes 8 and 9A to form the Average Frame Data×Average $P_{ij}$ Product (Box 11), which is an array. As shown in the bottom portion of FIG. 3, the Average Frame Data×Average $P_{ij}$ Product is subtracted from the Frame Data×$P_{ij}$ Products Average to form the intermediate $G^{(2)}$ij Image of Box 12. In Box 13 the sum of the intermediate $G^{(2)}$ij Images for the frames 1-N is calculated to produce the final composite image.

A preferred embodiment of the present invention comprises multiple photo-sensor buckets scanned or in an array and high resolution images of the illuminating light source. Depending on the object and the light source that it is scattering and reflecting it is possible that light is scattering or reflecting from any location on the subject such that any or all of the photo-sensors in the array has a probability of measuring one or more photons of light. A low resolution camera can be used as the multiple photo-sensor bucket array. This invention demonstrates that a higher resolution $G^{(2)}$ image of the target can be produced using high-resolution images of the illumination source coupled with information from the multiple photo-sensor bucket array. Use of the multiple photo-sensor bucket array can improve the convergence rate of the high resolution $G^{(2)}$ image. Each photo-sensor in the multiple photo-sensor bucket array may measure light scattered and reflected from distinct portions of the target object with appropriate optics that images the subject onto the multiple photo-sensor bucket array.

A concept of the present invention is that if the nonspatial information resolving single-pixel "bucket" detector that measures light from the target object that is typically used for $G^{(2)}$ imaging was replaced with a low resolution spatial information resolving device such as a Charge Coupled Device (CCD) camera and the detector that measures the light from the source of illumination is a high resolution spatial information resolving device, i.e., a high resolution CCD, then one could use the techniques of $G^{(2)}$ imaging to generate an image that would be at the resolution and quality of the high-resolution device using the extra information measured by the low-resolution target object detector. This may be accomplished by treating each nonspatial information resolving pixel of the low-resolution detector as a separate "bucket" measurement to create a $G^{(2)}$ image. The generation of $G^{(2)}$ images is performed over the entire set of pixels of the low resolution camera and each low-resolution $G^{(2)}$ image is accumulated into a composite $G^{(2)}$ image that provides the final result. It should be noted that prior to generating a low-resolution pixel $G^{(2)}$ image, the low-resolution pixel value can be tested to determine by some metric if a $G^{(2)}$ image should be computed using that low-resolution pixel, i.e., an option includes not computing a $G^{(2)}$ image if all the values at that low resolution pixel are 0 or below some threshold value.

Another preferred embodiment uses a single bucket detector to scan over different areas of a target. At each step of the scan a $G^{(2)}$ image would be computed and accumulated into a composite $G^{(2)}$ image for all positions that the detector scanned.

A third preferred embodiment utilizes the concept occurring when a set of random or pseudo-random pixels of the multiple photo-sensor bucket array measure light from the target subject. This random set of pixels may be different from one measurement time to another measurement time and these sets of random bucket pixels are used to compute sets of $G^{(2)}$ images that are accumulated into a higher resolution and higher quality composite $G^{(2)}$ image.

It should be noted that the calculation of the $G^{(2)}$ image may be accomplished by using optimization methods such as Compressive Sensing techniques.

Figure 4:
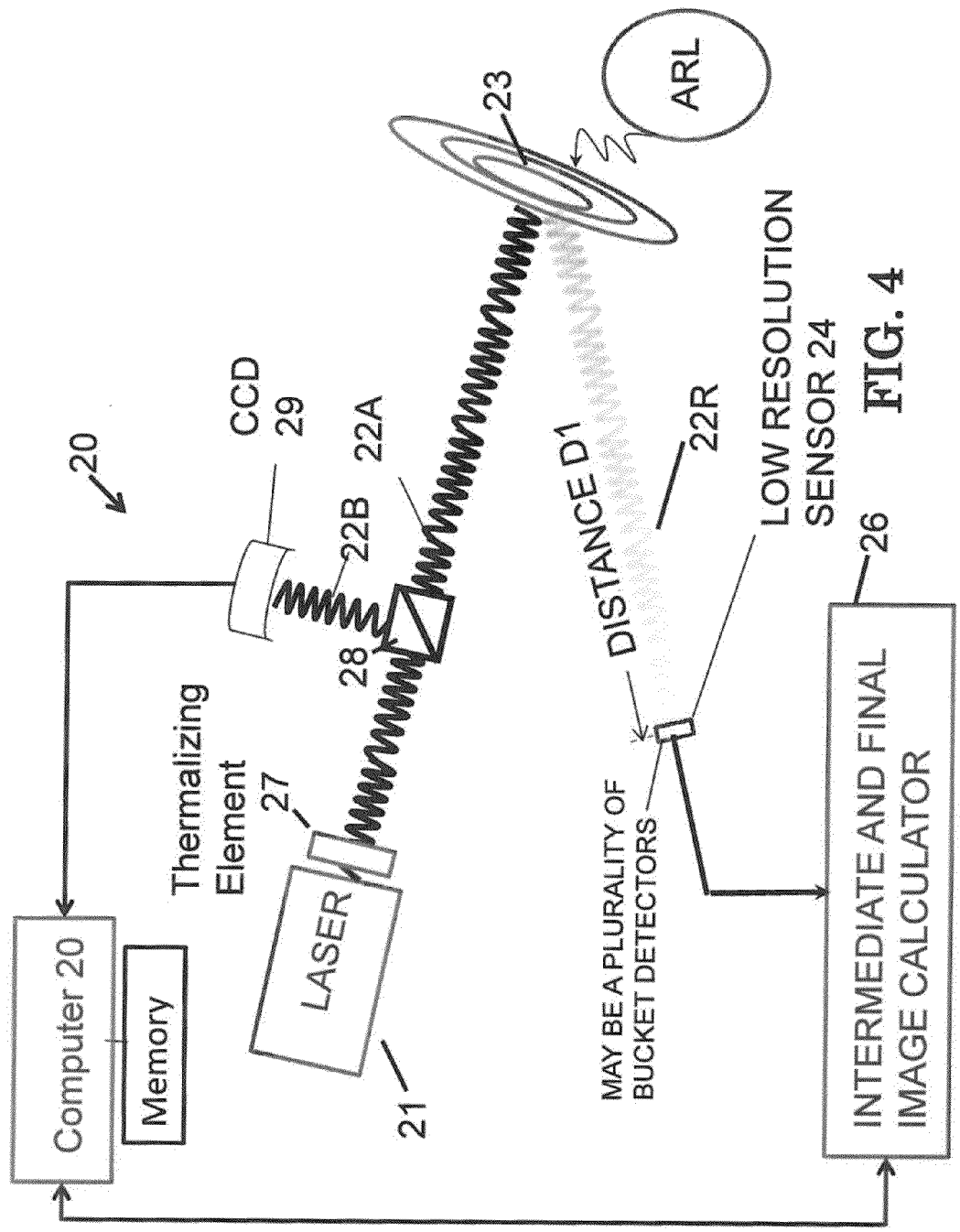
FIG. 4 is schematic system block diagram of a preferred embodiment according to the principles of the present invention comprising, inter alia, a thermalizing element 17.

FIG. 4 is an illustration of a preferred embodiment system using entangled photon pairs in which a first part of entangled pair is sent towards a target 23 while a second part is sent along a reference path 12B. If the first part of the entangled photon pair is absorbed or reflected by the target, it will affect a property (e.g., spin, polarization, transverse momentum, angular momentum, color) of the photon. The influence by the target is also reflected in the reference photons. In FIG. 4 in a preferred embodiment, incoherent, partially coherent, chaotic or entangled light source is reflected from a subject target into a bucket detector which does not process spatial information and in effect, merely measures the "quantity" of light reflected from the subject into a plurality of bucket detectors 24. A detector (CCD 29) is a spatial detector illuminated by the light source. Using spatial information from the second detector in conjunction with the light measurement from the first detector, an image is generated using coincidence circuitry.

Figure 5:
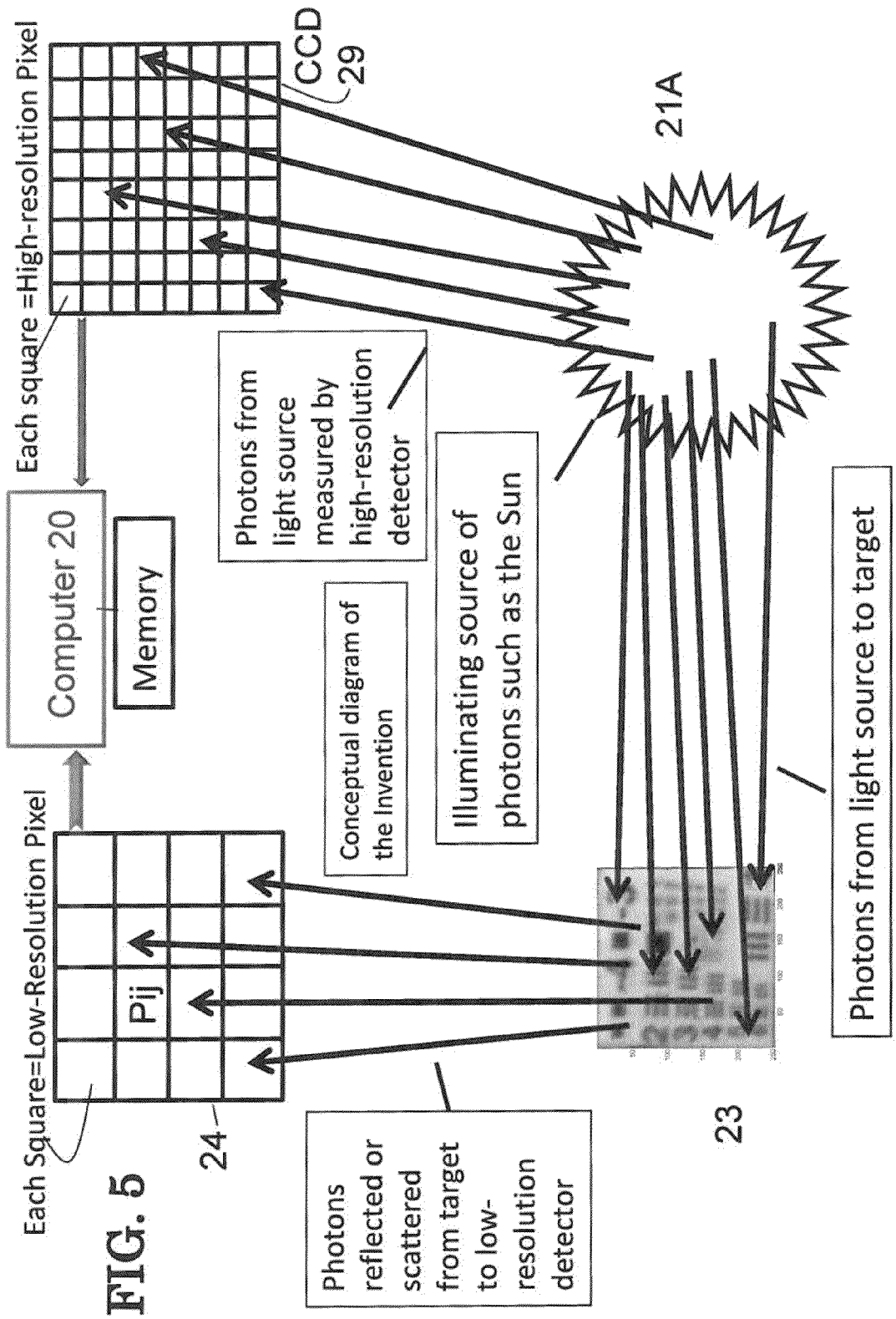
FIG. 5 is a conceptual diagram of a preferred embodiment of the present invention, such as for example, that shown in FIG. 4.

Shown in FIG. 4 is a laser 21 that sends light through a thermalizing element 27 which creates a light pattern. A beam splitter 28 is used to split the beam from the laser 21 into a target path 22A and a reference path 22B. The pattern of the beam is recorded by a charge coupled device (CCD) 29 or the like which records spatial information concerning the light pattern as discussed more fully in U.S. application Ser. No. 12/330,401, hereby incorporated by reference. In its simplest terms, CCD is a device for the movement of electrical charge from the detector area (29) to an area where the charge can be manipulated, for example conversion into a digital value. CCDs may be implemented as shift registers that move charge between capacitive bins in the device. The CCD device may be made up of semiconductors arranged in such a way that the electric charge output of one semiconductor charges an adjacent one. The CCD device may be integrated with an image sensor, such as a photoelectric device to produce the charge that is being read for digital imaging. The CCD device 29 may optionally be a camera, photodetector array or a photographic device capable of imaging the beam pattern 22B. The beam pattern comprising the spatial information concerning the light beam 22B is sent to computer 20. Light Beam 22A is directed to the target 23 and the returned and scattered light is collected by a first detector or sensor 24. Detector 24 may be a plurality of bucket detectors, or any kind of detectors which have the capability of detecting a photon strike. Detectors 24 may be of a large variety of photo detectors well known to those of ordinary skill in the art. A feature of the preferred embodiments of FIGS. 4 and 5 is that the detectors 24, individually, need not record spatial information regarding the target 23. However, cumulatively, spatial information is derived; although at low resolution. The spatial information derived by spatial detector 29 is transmitted to the computer 20 which combines and correlates this spatial information with the coincidence data received from detectors 24. For example, the data recorded by detectors 24 may be transmitted to computer 20 in a form resembling that depicted in FIG. 5, for example, where roughly 16 "bucket" measurements are represented.

The spatial information from detector 29 is combined with the coincidence information from the detectors 14 in computer 20. Computer 20 may be a microprocessor, processor, multiprocessor, CPU, mainframe, or any computing element capable of combining the spatial information from the detector 29 with the coincidence information from detectors 14. Further description of the coincidence detection feature is found in U.S. Pat. No. 7,536,012 and U.S. patent application Ser. No. 12/330,401, both of which are hereby incorporated by reference. Since the photonic information detected by each particular detector 14 need not encompass spatial information, but simply indicate the occurrence of a photon returned from the target 23, this capability facilitates the use of the preferred embodiment systems in environments in which the returned photons may be impacted by environmental conditions such as fog, smoke, atmospheric particles and the like.

A quantum photon mathematical equation will project the reference light intensity from the CCD 29. This will be combined with "bucket" photon information (such as that exemplified in FIGS. 4 and 5) for an ensemble of pulses to produce coincidence measurements needed for "ghost" imaging. The terminology "ghost" relates to the feature that the spatial information is not reflected from the target but is either derived from the modulation of the laser beam (not shown) or the spatial information obtained through the use of beam splitter 28 and detector 29 which records spatial information from a beam which has not "seen" or illuminated the target.

FIG. 5 is a conceptual diagram of a preferred embodiment of the present invention, such as for example, that shown in FIG. 4. Represented in FIG. 5 is a light source 21A which may be the sun (or a laser 21 as shown in FIG. 4). The light source 21A illuminates both the target 23 (which may be for example, the standard Air Force USAF resolution test chart). Light is reflected from the target into an array of "bucket" detectors as represented by an a 4×4 array 24 in FIG. 5. Photons from the light source 21A are also measured by CCD 29, in a manner as described in connection with FIG. 4. The high resolution array is represented by an 8 by 8 array, although any of a plurality of high resolution arrays may be used, such as in the form of a high resolution camera or the like. Note that light rays or photons reflected from the target 23 do not enter CCD 29. CCD 29 derives spatial information from the light sources 21A as opposed to target 23.

Figure 6:
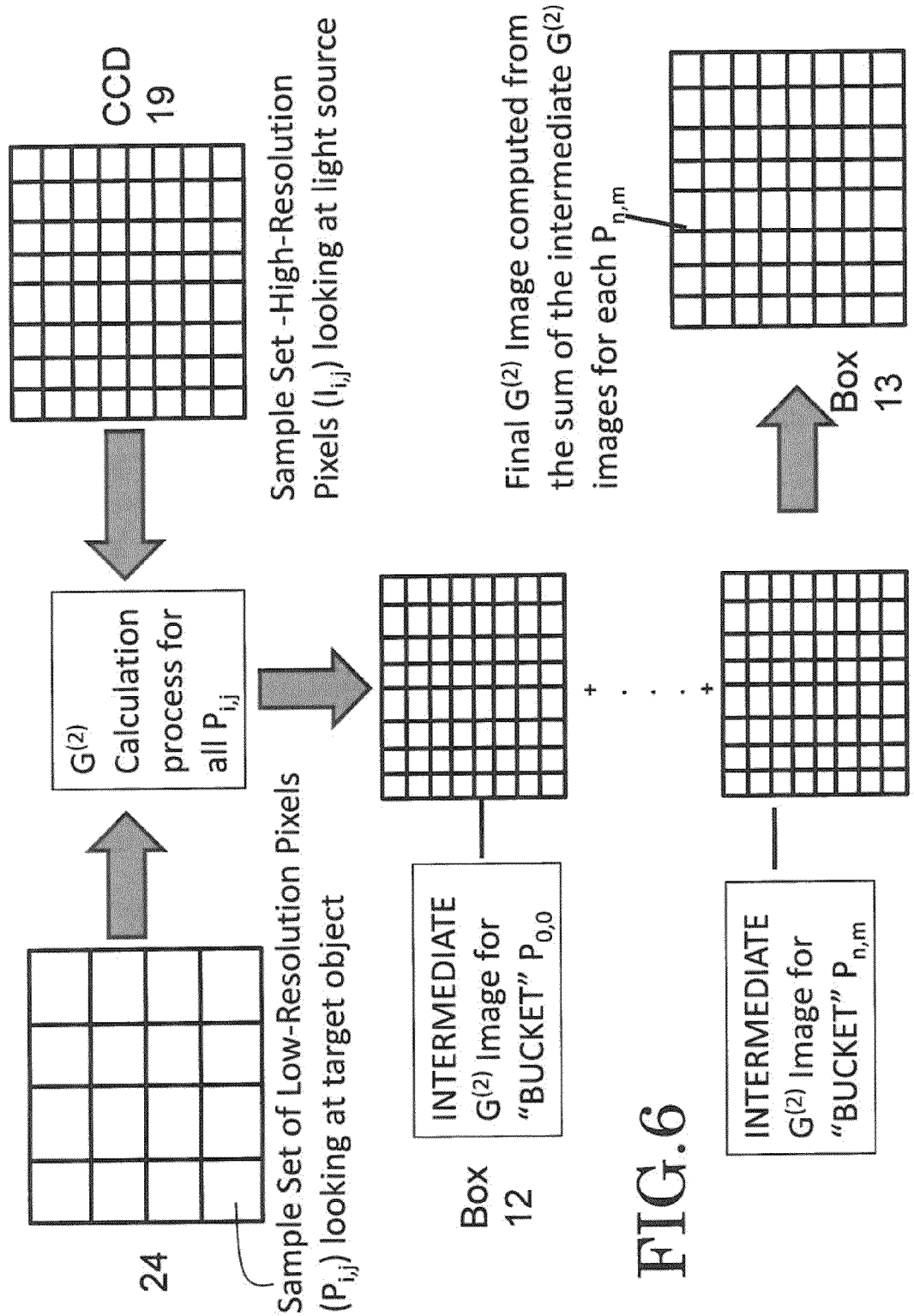
FIG. 6 is a conceptual diagram of a preferred embodiment of the present invention, showing, inter alia, the summation of intermediate $G^{(2)}$ images.

FIG. 6 is a further conceptual diagram of a preferred embodiment of the present invention as a further example of an embodiment of the present invention. Represented in FIG. 6 are the high resolution CCD 29 and the low resolution source 24. The low resolution source may be any source of low resolution pixels. For example, it could be an analog photograph with reflected light correlating to the pixel values. In FIG. 6, the intermediate $G^{(2)}$ images as represented by Box 12 in FIG. 3, are summed together to form the Final $G^{(2)}$ images (designated as Box 13). Optionally, the intermediate $G^{(2)}$ images may be weighted such that different values are assigned to different intermediate images. For this reason the image could be optimized, for example, for transmission or specific feature extraction. For example, if the background surrounding an object is of more importance than the object, this information would be weighted accordingly.

By way of example, FIG. 7A correlates to the image as produced using the methodology described in FIG. 5A of U.S. Pat. No. 7,812,303 (ARL 07-33) and FIG. 7B correlates to an image produced through to the processing stage as depicted at Box 12 of FIG. 3.

As further examples of image processing according to the methodology of the present invention, FIG. 8A is an image produced as represented at Box 12 and FIG. 8B correlates to the image produced when the process reaches Box 13.

As further examples of image processing according to the methodology of the present invention, FIG. 9B is a low resolution image correlating to Box 9 of FIG. 3 where blocks of 2×2 pixels are processed together. FIG. 9A is 1 by 1 a spatially averaged set of pixels of the target subject which correlates to an equivalent high resolution image.

FIGS. 10A and 10B correlate to the image produced at the processing stage represented by Box 12 of FIG. 3. FIG. 10A is an illustration of an intermediate image constructed using a single bucket consisting of 4×4 pixels of a simulated low-resolution multiple photo-sensor bucket array. FIG. 10B is an illustration of an intermediate image constructed using a single bucket consisting of 4×4 pixels of a simulated low-resolution multiple photo-sensor bucket array.

FIGS. 11A and 11B correlate to the images produced at the processing stages represented by Box 9 and Box 13 of FIG. 3, respectively. FIG. 11A is an illustration of an average image measured by a low-resolution multiple photo-sensor bucket array simulated by 4×4 pixel spatial averaging. FIG. 11B is an illustration of a final composite image produced by the sum of all the intermediate images using a set of buckets consisting of 4×4 pixels of a simulated low-resolution multiple photo-sensor bucket array.

FIGS. 12A and 12B correlate to the images produced at the processing, stages represented by Box 12 of FIG. 3. FIG. 12A is an illustration of an intermediate image constructed using a single bucket consisting of 8×8 pixels of a simulated low-resolution multiple photo-sensor bucket array. FIG. 12B is an illustration of an intermediate image constructed using a single bucket consisting of 8×8 pixels of a simulated low-resolution multiple photo-sensor bucket array.

FIGS. 13A and 13B correlate to the images produced at the processing stages represented by Box 9 and Box 13 of FIG. 3, respectively. FIG. 13A is an illustration of an average image measured by a low-resolution multiple photo-sensor bucket array simulated by 8×8 pixel spatial averaging. FIG. 13B is an illustration of a final composite image produced by the sum of all the intermediate images using a set of buckets consisting of 8×8 pixels of a simulated low-resolution multiple photo-sensor bucket array.

FIGS. 14A and 14B correlate to the images produced at the processing stages represented by Box 12 of FIG. 3. FIG. 14A is an illustration of an intermediate image constructed using a single bucket consisting of 8×8 with overlap of 4 pixels of a simulated low-resolution multiple photo-sensor bucket array. FIG. 14B is an illustration of an intermediate image constructed using a single bucket consisting of 8×8 with overlap of 4 pixels of a simulated low-resolution multiple photo-sensor bucket array.

FIGS. 15A and 15B correlate to the images produced at the processing stages represented by Box 9 and Box 13 of FIG. 3, respectively. FIG. 15A is an illustration of an average image measured by a low-resolution multiple photo-sensor bucket array simulated by 8×8 with overlap of 4 pixel spatial averaging. FIG. 15B is an illustration of a final composite image produced by the sum of all the intermediate images using a set of buckets consisting of 8×8 overlap of 4 pixels of a simulated low-resolution multiple photo-sensor bucket array.

FIGS. 16A and 16B correlate to the images produced at the processing stages represented by Box 13 of FIG. 3. FIG. 16A is an illustration of a final composite image produced by the sum of all the intermediate images using a set of buckets simulating a low resolution multiple photo-sensor bucket array that consisted of 1 randomly spatially located pixel for 1400 shots. FIG. 16B is an illustration of a final composite image produced by the sum of all the intermediate images using a set of buckets simulating a low resolution multiple photo-sensor bucket array that consisted of 2 randomly spatially located pixels for 1400 shots.

FIGS. 17 through 19 correlate to the images produced at the processing stages represented by Box 13 of FIG. 3.

FIG. 17A is an illustration of a final composite image produced by the sum of all the intermediate images using a set of buckets simulating a low resolution multiple photo-sensor bucket array that consisted of 2 randomly spatially located pixels for 500 shots.

FIG. 17B is an illustration of a final composite image produced by the sum of all the intermediate images using a set of buckets simulating a low resolution multiple photo-sensor bucket array that consisted of 1000 randomly spatially located pixels for 10 shots.

FIG. 18A is an illustration of a final composite image produced by the sum of all the intermediate images using a set of buckets simulating a low resolution multiple photo-sensor bucket array that consisted of 20 randomly spatially located pixels for 150 shots.

FIG. 18B is an illustration of a final composite image produced by the sum of all the intermediate images using a set of buckets simulating a low resolution multiple photo-sensor bucket array that consisted of 100 randomly spatially located pixels for 150 shots.

FIG. 19A is an illustration of the final composite image produced by the sum of all the intermediate images using a set of buckets simulating a low resolution multiple photo-sensor bucket array that consisted of 10 randomly spatially located pixels for 150 shots.

FIG. 19B is an illustration of the final composite image produced by the sum of all the intermediate images using a set of buckets simulating a low resolution multiple photo-sensor bucket array that consisted of 1000 randomly spatially located pixels for 150 shots.

As described above, generally speaking, the progression of image stages in FIG. 3 are represented in the presentation and comparison of images in FIGS. 7 through 19 in order to demonstrate that high resolution images are producible from low resolution images using the principles of the present invention.

The preferred embodiments of the present invention described herein are based upon the calculation of a $G^{(2)}$ "ghost" image for each bucket detector over the set of all bucket detectors that comprise the low resolution target object detector; however, the present invention is not limited to the specifics of the embodiments disclosed. Each of the intermediate $G^{(2)}$ images are summed into a final composite image of the target object A "ghost" or $G^{(2)}$ image as used herein may be mathematically expressed as a result of a convolution between the aperture function (amplitude distribution function) of the object $A(\bar{r}_o)$ and a δ-function like second-order correlation function $G^{(2)}(\bar{r}_o, \bar{r}_i)$ $$F(\bar{\rho}_i) = \int_{obj} d\bar{\rho}_o A(\bar{\rho}_o) G^{(2)}(\bar{\rho}_o, \bar{\rho}_i), \quad (1)$$

where $G^{(2)}(\bar{r}_o, \bar{r}_i): d(\bar{r}_o - \bar{r}_i/m)$, $\bar{r}_o$ and $\bar{r}_i$ are 2D vectors of the transverse coordinate in the object plane and the image plane, respectively, and m is the magnification factor. The term δ function as used herein relates to the Dirac delta function which is a mathematical construct representing an infinitely sharp peak bounding unit area expressed as δ(x), that has the value zero everywhere except at x=0 where its value is infinitely large in such a way that its total integral is 1. The δ function characterizes the perfect point-to-point relationship between the object plane and the image plane. If the image comes with a constant background, as in this experiment, the second-order correlation function $G^{(2)}(\bar{r}_o, \bar{r}_i)$ in Eq. (1) must be composed of two parts $$G^{(2)}(\bar{\rho}_o, \bar{\rho}_i) = G_0 + \delta(\bar{\rho}_o - \bar{\rho}_i/m) \quad (2)$$

where $G_0$ is a constant. The value of $G_0$ determines the visibility of the image. One may immediately connect Eq. (2) with the $G^{(2)}$ function of thermal radiation $$G^{(2)} = G_{11}^{(1)} G_{22}^{(1)} + |G_{12}^{(1)}|^2, \quad (3)$$

where $G_{11}^{(1)} G_{22}^{(1)} \sim G_0$ is a constant, and $|G_{12}^{(1)}|^2 \sim d(\bar{r}_1 - \bar{r}_2)$ represents a nonlocal position-to-position correlation. Although the second-order correlation function $G^{(2)}$ is formally written in terms of $G^{(1)}$s as shown in equation (3), the physics are completely different. As we know, $G_{12}^{(1)}$ is usually measured by one photodetector representing the first-order coherence of the field, i.e., the ability of observing first-order interference. Here, in equation (3), $G_{12}^{(1)}$ may be measured by independent photodetectors at distant space-time points and represents a nonlocal EPR correlation.

The present invention uses as its basis the calculation of a $G^{(2)}$ ghost image for each bucket detector over the set of all bucket detectors that comprise the low resolution target object detector. Each of the intermediate $G^{(2)}$ images are summed into a final composite image of the target object $$\text{Image}_{final} = \Sigma G_i^{(2)} \quad (4)$$

where Σ indicates a summation operation. Similarly, when using Compressive Sensing (CS) techniques the R term of Eq. (9) is computed for each bucket for an intermediate image and these intermediate images are then summed as show in equation 4 to produce a final image of the target object.

Typically ghost imaging uses two detectors, one to observe the light source and the other, single pixel or bucket detector, to observe the light scattering and reflecting from the target object.

$$G^{(2)} = \langle I(x,y,t)_{source} I(t)_{bucket} \rangle - \langle I(x,y,t)_{source} \rangle \langle I(t)_{bucket} \rangle \quad (5)$$

where ⟨ ⟩ denotes an ensemble average. As used herein, and terminology "bucket" in general means a single pixel detector, a detector comprising a plurality or grouping of pixels, a low resolution imaging device, a low resolution scanning detector (or device) or the like. The terminology $I(t)_{bucket}$ means the measurements taken from a single pixel detector, a detector comprising a plurality or grouping of pixels, a low resolution imaging device, a low resolution scanning detector (or device) or the like.

A relatively new mathematical field named Compressive Sensing (CS) or Compressive Imaging (CI) can be used to good effect within the context of $G^{(2)}$ imaging. The use of compressive techniques in the context of Ghost Imaging was performed by the Katz group (see O. Katz, et al., "Compressive Ghost Imaging," Appl Phys. Lett., 95, 131110 (2009)) (hereby incorporated by reference) who demonstrated a ghost like imaging proposal of Shapiro (see J. Shapiro, "Computational Ghost Imaging," Phys. Rev. A 78 061802(R) (2008)) (hereby incorporated by reference).

The use of CS and Compressive Imaging (CI) herein is based on finding approximate solutions to the integral equations using the Gradient Projection for Sparse Reconstruction (GPSR) mathematical methodology where $$JR = B \quad (6)$$

and $$R = R(x,y) \quad (7)$$

is the object reflectance. The term J is a matrix, where the rows are the illumination patterns at time k and the B vector:

$$B = [B_k] \quad (8)$$

represents the bucket values. In cases where the system is underdetermined (too few [$B_k$]), then $L_1$ constraints are applied to complete the system and sparseness is used:

$$\operatorname*{argmin}_R = \frac{1}{2}\|B - JR\|_2^2 + \tau\|R\|_1 \qquad (9)$$

The CS computational strategy takes advantage of the fact that it is normally true in images that not all pixels in an image contain new information and the system is said to be sparse on some basis since fewer degrees of freedom are needed to describe the system than the total number of pixels in the image. The parameter τ in equation (9) is often a constant.

The problem is then solvable using, for example, an L1 minimization as described further in "Compressed Sensing, IEEE TRANSACTIONS ON INFORMATION THEORY, VOL. 52, NO. 4, APRIL 2006" and "Gradient Projection for Sparse Reconstruction: Application to Compressed Sensing and Other Inverse Problems, IEEE J. Sel. Top. in Sig., Proc. 1, 586 2007." (both of which are hereby incorporated by reference).

In an alternative preferred embodiment, when illuminating light source comprises entangled photons, in order to resolve the issue of multiple counts (i.e., counts originating from background photons), the following sequence is preformed:

providing a high speed time stamped series of low resolution frames of a given region of interest from the array of pixel locations;

providing a high speed time stamped series of high resolution images of a light source from the spatial detector;

the high speed time stamped frames being such that there is only one photon counted (or measured) on a pixel in both the low resolution frame and the high resolution frame per unit time (if more than one pixel is counted, the frame of pixels is discarded—This is to ensure proper discrimination of entangled photons from background light.)

determining the value of each pixel at each location per unit time within each high resolution frame to form first arrays of pixel values;

determining the value of each pixel at each location per unit time within each low resolution frame to form a second array of pixel values;

for each low resolution pixel location in the second array:
determining a third array (which corresponds to the intermediate image) of time coincident values (i.e., when entangled photons are jointly measured) for the low resolution pixel location and each pixel in each high resolution image for the series of frames;
summing together the third arrays to provide a final composite high resolution image.

Applications of the present invention improve the ability to image through obscuring media (e.g., smoke or clouds), which remains a problem in a variety of fields, such as satellite imaging analysts, firefighters, drivers, oceanographers, astronomers, military personnel, and medical personnel. The present invention improves the ability to improve resolution in each of these exemplary instances and represents an opportunity to derive more information from images and presumably the decisions made from such images. By way of example, improved resolution in x-ray or endoscopy medical imagery facilitates lower radiation dosing and diagnosis of abnormal morphologies earlier than currently possible with conventional imaging methodologies. Conventional imaging techniques have, to a large extent, arrived at the theoretical limits of image resolution owing to wavelength-limited resolution, optical element distortions, and the reflective interaction between photons and an object to be imaged.

As used herein the terminology $G^{(2)}$ technique means where you have two measurements where the actual image is the convolution of the object function $F(\overline{\rho}_t) = \int_{obj} d\overline{\rho}_o A(\overline{\rho}_o) G^{(2)}(\overline{\rho}_o, \overline{\rho}_t)$, where the object function A is convolved with the correlations between two spatially distinct detections.

As used in the following, the terminology photon light source means or is defined to include, thermal photon light, partially coherent, and entangled photon light. As used in the following, the terminology media means or is defined to include vacuum, air, water, turbid fluids, turbulence fluids, soft tissues and partially transmissive solids.

As used herein, the terminology "subject" or "object" or "target" may include a photograph, a thing, a person, animate or inanimate subject, a plurality of objects, the ground, ground covering (e.g., grass), a localized piece or pieces of the environment, surface, physical entity (or entities) or anything that can be observed.

As used herein, the terminology "bucket" refers to a single-pixel (bucket) detector.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Patents, patent applications, or publications mentioned in this specification are incorporated herein by object to the same extent as if each individual document was specifically and individually indicated to be incorporated by object.

The foregoing description of the specific embodiments are intended to reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A system for imaging information comprising;
at least one processor for processing information;
a light source for illuminating first and second locations;
a spatial receiver located at the second location for receiving illumination from the light source comprising an array of pixel locations for detecting high resolution spatial information concerning the illumination; the spatial receiver being operatively connected to the at least one processor and operating to transmit high resolution spatial information correlated to specific intervals of time to the processor;
at least one first receiver operative to receive light reflected from a subject, the at least one first receiver being operatively connected to the processor and operating to transmit low resolution spatial information to the processor correlated to specific intervals of time;
the processor operating to correlate a response by the at least one first receiver with spatial information derived from the spatial receiver at a correlating intervals of time to create a high resolution image of the subject.

2. The system of claim 1 further comprising a beam splitter, the light from the light source comprising entangled photon pairs, the entangled photon pairs entering the beam splitter being split into the first and second beams, and wherein the at least one first receiver comprises an array of locations with each location having at least one low resolution receiver, the array of locations of at least one low resolution receiver comprising a pixel location.

3. The system of claim 1 wherein for each of the outputs of the at least one first receiver and the spatial receiver measurements in the form of pixel values are taken at specific instances in time, and for each of the first receiver and the spatial receiver the pixel values at each of the pixel locations are added together to form a sum of the pixel values at each pixel location over a predetermined number of measurements and then divided by predetermined number of measurements to form an average value of each pixel at each pixel location for the series of frames for both the spatial receiver and at least one first receiver, and wherein the average pixel values for the spatial receiver and at least one first receiver are multiplied together to form a first product of the averages; and wherein the pixel values of the spatial receiver measurements taken at specific instances in time are individually multiplied by each of the pixel values at the pixel locations of the first receiver and summed together to form the sum of the product of pixel values of the spatial receiver measurements times each of the pixel values at the pixel locations of the first receiver and then divided by the number of specific instances in time to form a second product of averages, and wherein the first product of averages is subtracted from second product of averages to form the enhanced image.

4. The system of claim 1 wherein the outputs of the spatial receiver and the at least one first receiver are optimized pursuant to a compressed sensing algorithm to give an intermediate image and the intermediate images are summed together to produce an enhanced image.

5. The system of claim 1 wherein the outputs of the spatial receiver and the at least one first receiver are optimized to create a $G^{(2)}$ intermediate image wherein different weights are assigned to different $G^{(2)}$ intermediate images based upon predetermined criteria prior to computing the high resolution image of the subject.

6. The system of claim 1 wherein each of the low resolution pixels are treated as nonspatial information to create a $G^{(2)}$ image and the generation of $G^{(2)}$ images is performed over the entire set of pixels of the low resolution array of receivers and each low-resolution $G^{(2)}$ image is accumulated into a composite $G^{(2)}$ image to produce the resolved image.

7. The system of claim 1 wherein prior to generating an intermediate $G^{(2)}$ image, the low-resolution pixel value can be tested to determine by a predetermined criteria if a $G^{(2)}$ image should be computed using that low-resolution pixel.

8. The system of claim 1 wherein the light reflected from the subject was influenced by the effects of turbulence or bad or changing weather.

9. The system of claim 1 wherein the at least one first receiver is one of a camera, scanning detector, or charge coupled device.

10. A method for image improvement comprising the following steps not necessarily in sequential order:
providing a series of low resolution frames of a given region of interest;
providing a series of high resolution images of a light source;
determining the value of each pixel at each location within each high resolution frame to form first arrays of pixel values;
determining the value of each pixel at each location within each low resolution frame to form a second array of pixel values;
determining the product of the first array of pixel values and the second array of pixel values;
determining the sum of the products by adding together the products of first array of pixel values and second array of pixel values for a series of frames;
determining the average of the sum of products by dividing the sum of products by the number of frames in the series of frames to form an average high resolution frame times low resolution pixel product;
determining the average value of each pixel at each pixel location for the series of high resolution frames to form a third array of average pixel values;
determining the average values at each pixel location for the series of low resolution frames to form a fourth array;
for each low resolution pixel location in the second array:
determining a fifth array of products of the low resolution pixel location times each pixel in each high resolution image for the series of frames;
summing the third arrays for the series of frames and dividing by the number of frames in the series to form a sixth array comprising the average product of the low resolution pixel location times the high resolution frames;
determining the product of the third array times the value at the low resolution pixel location of the fourth array to form a seventh array;
determining an intermediate image for the pixel location in the low resolution frame by subtracting the seventh array from the sixth array to form an eighth array;
summing together the eighth arrays to provide a final composite high resolution image.

11. The method of claim 10 wherein the step of determining the value of each pixel at each location within each low resolution frame comprises using a digital camera.

12. The method of claim 10 wherein the step of determining the value of each pixel at each location within each low resolution frame comprises illuminating a subject and determining the amount of light reflected from the subject by detecting the reflected illumination using at least one receiver.

13. The method of claim 10 wherein the outputs of the high resolution frames and the low resolution frames are optimized to create an intermediate image wherein different weights are assigned to different intermediate images based upon predetermined criteria prior to computing the high resolution image of the subject.

14. The method of claim 10 wherein the outputs of the high resolution frames and the low resolution frames are optimized pursuant to a compressed sensing algorithm to give an intermediate image and the intermediate images are summed together to produce an enhanced image.

15. The method of claim 10 wherein the light source comprises utilizing a light source of entangled photons which are split into first and second beams, and wherein the step of providing a series of high resolution images of a light source comprises using a spatial receiver to receive the first light beam and the step of providing a series of low resolution frames of a given region of interest comprises illuminating the low resolution frames with the second beam.

16. The method of claim 10 wherein prior to generating a low-resolution pixel $G^{(2)}$ image, the low-resolution pixel value can be tested to determine by a predetermined criteria if a $G^{(2)}$ image should be computed using that low-resolution pixel.

17. The method of claim 10 wherein the step of providing a series of frames of a given region of interest comprises computing the average overall intensity of a plurality of frames of the low resolution detector array and arranging the frames of the low resolution and high resolution detector arrays into two sets; the first set containing the frames having frame intensities greater than the average intensity of the pixels in the low resolution array and the second set containing frames having intensity less than the average intensity of the pixels in the low resolution array; both the high resolution frames and low resolution frames being indexed by a similar time; each of the first and second sets being processed by repeating the following steps for each low resolution pixel location in the first and second sets:
    determining a fifth array of products of the low resolution pixel location times each pixel in each high resolution image for the series of frames;
    summing the third arrays for the series of frames and dividing by the number of frames in the series to form a sixth array comprising the average product of the low resolution pixel location times the high resolution frames;
    determining the product of the third array times the value at the low resolution pixel location of the fourth array to form a seventh array;
    determining an intermediate image for the pixel location in the low resolution frame by subtracting the seventh array from the sixth array to form an eighth array;
    summing together the eighth arrays to provide a final composite high resolution image;
to thereby obtain first and second results; further refined images are then produced by adding or subtracting weighted first and second results; the weighting being correlated to the number of frames in the above mean and below mean sets respectively.

18. A system of enhancing a series of low resolution images by using high resolution images of an illuminating source taken concurrently in time with low resolution images that are illuminated by the illuminating source comprising:
    at least one processor;
    a high resolution spatial detector;
    at least one low resolution detector comprising an array of pixel locations adapted to record a series of low resolution images;
    a light source which emits entangled photons pairs, the first photons of the photon pairs being reflected off a target to into an array of pixel locations to create a series of low resolution images using the at least one low resolution detector; the second photons of the photon pairs being inputted into a high resolution image spatial detector; the second photons not being reflected from or passing through the target;
    coincidence circuitry that transmits the measurements from the array of pixel locations and the high resolution spatial detector to the at least one processor at specific instances in time;
    whereby the at least one processor enhances the low resolution images recorded at the array of pixel locations using the first photons by combining the low resolution measurements from the at least one low resolution detector with the series of high resolution measurements detected by the high resolution spatial detector using the second photons.

19. The system of claim 18 wherein the at least one low resolution detector comprises one of a photo detector at each location in the array of pixel locations or a digital camera comprising an array of pixel locations and wherein the system further comprises at least one memory operatively associated with the at least one processor for the storage of the at least one low resolution image.

20. The system of claim 18 wherein the at least one processor performs the following steps, not necessarily in the sequence recited:
    processing at least one low resolution image from the low resolution detector;
    processing at least one high resolution image of a light source from the spatial detector taken concurrently in time with the recording of the at least one low resolution image;
    the processing of the at least one low resolution image and the at least one high resolution image being such that there is only one photon counted on a pixel in both the at least one low resolution detector and the high resolution spatial detector frame at the same time increment time;
    determining the value of each pixel at each location at each time increment within each high resolution image to form first arrays of pixel values;
    determining the value of each pixel at each location at each time increment within each low resolution image to form a second array of pixel values;
    for each low resolution pixel location in the second array:
        determining a third array of time coincident values for the low resolution pixel location of the second arrays and each pixel in each high resolution image of the first arrays of pixel values; and
        summing together the third arrays to provide a final composite high resolution image.

* * * * *